US012212754B2

(12) United States Patent
Schwarz et al.

(10) Patent No.: US 12,212,754 B2
(45) Date of Patent: *Jan. 28, 2025

(54) DEPENDENT QUANTIZATION

(71) Applicant: Fraunhofer-Gesellschaft zur Förderung derangewandten Forschung e.V., Munich (DE)

(72) Inventors: Heiko Schwarz, Berlin (DE); Thomas Wiegand, Berlin (DE); Phan Hoang Tung Nguyen, Berlin (DE); Detlev Marpe, Berlin (DE)

(73) Assignee: Fraunhofer-Gesellschaft zur Förderung derangewandten Forschung e.V., Munich (DE)

( * ) Notice: Subject to any disclaimer, the term of this patent is extended or adjusted under 35 U.S.C. 154(b) by 44 days.

This patent is subject to a terminal disclaimer.

(21) Appl. No.: 17/987,827

(22) Filed: Nov. 15, 2022

(65) Prior Publication Data

US 2023/0075174 A1 Mar. 9, 2023

Related U.S. Application Data

(63) Continuation of application No. 17/033,197, filed on Sep. 25, 2020, now Pat. No. 11,533,486, which is a (Continued)

(30) Foreign Application Priority Data

Mar. 29, 2018 (EP) .................................. 18165210.8

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/126* (2014.11);
(Continued)

(58) Field of Classification Search
None
See application file for complete search history.

(56) References Cited

U.S. PATENT DOCUMENTS

2015/0071344 A1 3/2015 Tourapis et al.
2015/0172661 A1* 6/2015 Dong .................. H04N 19/126 375/240.03
(Continued)

FOREIGN PATENT DOCUMENTS

CN 105308965 B 12/2018
CN 106416254 B 8/2019
(Continued)

OTHER PUBLICATIONS

First Office Action (and Translation) received in Chinese Application No. 201980036440.3, dated Mar. 21, 2022.
(Continued)

*Primary Examiner* — Michael J Hess
(74) *Attorney, Agent, or Firm* — Conley Rose, P.C.

(57) ABSTRACT

The coding of a media signal is rendered more efficient by describing the media signal using a sequence of samples and sequentially encoding this sequence by selecting, for a current sample, a set of quantization levels out of a plurality of quantization level sets depending on indices encoded into the data stream for previous samples of the sequence of samples, quantizing the current sample onto one level of the set of quantization levels, and encoding a quantization index to the one level for the current sample into the data stream. In other words, scalar quantization of the individual samples of the sequence of samples is used, but it is rendered
(Continued)

dependent on quantization indices encoded into the data stream for previous samples of the sequence of samples. By this measure, it is possible to "construe" a grid of quantization points in the multi-dimensional space across which all possible settings of the sequence of samples are spread, onto which values of the samples are quantized according to the sequence of quantization indices coded into the data stream. This grid, in turn, reduces, statistically, a mean quantization error.

20 Claims, 21 Drawing Sheets

Related U.S. Application Data continuation of application No. PCT/EP2019/057818, filed on Mar. 28, 2019.

(51) Int. Cl.

| | |
|---|---|
| ***H04N 19/126*** | (2014.01) |
| ***H04N 19/13*** | (2014.01) |
| ***H04N 19/159*** | (2014.01) |
| ***H04N 19/176*** | (2014.01) |
| ***H04N 19/18*** | (2014.01) |
| ***H04N 19/60*** | (2014.01) |
| ***H04N 19/70*** | (2014.01) |
| ***H04N 19/91*** | (2014.01) |

(52) U.S. Cl.

CPC ........... *H04N 19/13* (2014.11); *H04N 19/159* (2014.11); *H04N 19/176* (2014.11); *H04N 19/18* (2014.11); *H04N 19/60* (2014.11); *H04N 19/70* (2014.11); *H04N 19/91* (2014.11)

(56) References Cited

U.S. PATENT DOCUMENTS

| | | | | |
|---|---|---|---|---|
| 2016/0150230 A1* | 5/2016 | He | H04N 19/124 375/240.03 |
| 2016/0353112 A1 | 12/2016 | Zhang et al. | |
| 2017/0099488 A1 | 4/2017 | Tsukuba et al. | |
| 2017/0142412 A1* | 5/2017 | Fuchs | H04N 19/44 |
| 2019/0045185 A1* | 2/2019 | Fu | H04N 19/124 |
| 2019/0222845 A1* | 7/2019 | Taubman | H04N 19/647 |

FOREIGN PATENT DOCUMENTS

| | | |
|---|---|---|
| WO | 2014167179 A1 | 10/2014 |
| WO | 2016123792 A1 | 8/2016 |

OTHER PUBLICATIONS

Notice of Reasons for Rejection (and Translation) received in Korean Application No. 10-2020-7031324, Oct. 4, 2022.
Notice of Reasons for Rejections (and Translation) received in Japanese Application No. 2020-552352, Aug. 2, 2022.
Albrecht, M., et al., "Description of SDR, HDR and 360 Video coding Technology Proposal by Fraunhofer HHI", Joint Video Experts Team (JVET) of ITU-T SG 16 WP 3 and ISO/IEC JTC 1/SC 29/WG 11, 10th Meeting: San Diego, US, Apr. 10-20, 2018.
Budagavi, Madhukar, et al., "HEVC Transform and Quantization", High Efficiency Video Coding (HEVC), Jun. 26, 2014 Springer International Publishing, pp. 141-169, XP008181006, pp. 141-169.
Fischer, Thomas R., et al, "Entropy-Constrained Trellis Coded Quantization", IEEE Transactions on Information Theory, vol. 38, No. 2, Mar. 1992, pp. 415-426.
ITU-T and ISO/IEC, "Advanced Video Coding for Audiovisual Services", ITU-T Rec. H.264 and ISO|IEC 14406-10 (AVC), 2003.
ITU-T and ISO|IEC, "Advanced Video Coding for Generic Audio-visual Services", ITU-T Rec. H. 264, 2019, Uploaded in 3 parts.
ITU-T and ISO|IEC, "High Efficiency Video Coding", ITU-T Rec. H. 265 and ISO|IEC 23008-10 (HEVC), 2013.
ITU-T and ISO|IEC, "High Efficiency Video Coding", ITU-T Rec. H.265, 2019, uploaded in 4 parts.
Joshi, Rajan L., et al., "Arithmetic and Trellis Coded Quantization", Proceedings—1994 IEEE International Symposium on Information Theory, ISIT 1994—Trondheim, Norway, Jun. 27-Jul. 1, 1994, p. 233.
Kasner, James H., et al., "Universal Trellis Coded Quantization", IEEE Transactions on Image Processing, vol. 8, Issue 12, Dec. 1999, pp. 1677-1687.
Marcellin, Michael W., "On Entropy-Constrained Trellis Coded Quantization", IEEE Transactions on Communications, vol. 42, Issue 1, Jan. 1994, pp. 14-16.
Panchapakesan, Kannan, "A Study of Trellis Coded Quantization for Image Compression", Rochester Institute of Technology Scholar Works, Thesis, Jun. 1, 1996.

* cited by examiner

62

```
if( setId[ k ] == 0 ) {
    n = 2 * level[ k ]
} else {
    n = 2 * level[ k ] – sign( level[ k ] )
}
trec[ k ] = n * quant_step_size[ k ]
```

62

```
n = 2 * level[ k ] – ( setId[ k ] > 0 ? sign( level[ k ] ) : 0 )
trec[ k ] = ( n * scale[ k ] + add ) >> shift
```

| subsets of the two last quantization indexes | quantization set and path (given in parentheses) for the two last quantization indexes | quantization set for current transform coefficient | state variable |
|---|---|---|---|
| A A | 0(0), 0(0) | 0 | 0 |
| A B | 0(0), 0(1) | 0 | 0 |
| A C | 0(0), 1(0) | 1 | 2 |
| A D | 0(0), 1(1) | 1 | 2 |
| B A | 0(1), 0(0) | 1 | 2 |
| B B | 0(1), 0(1) | 1 | 2 |
| B C | 0(1), 1(0) | 0 | 0 |
| B D | 0(1), 1(1) | 0 | 0 |
| C A | 1(0), 0(0) | 0 | 1 |
| C B | 1(0), 0(1) | 0 | 1 |
| C C | 1(0), 1(0) | 1 | 3 |
| C D | 1(0), 1(1) | 1 | 3 |
| D A | 1(1), 0(0) | 1 | 3 |
| D B | 1(1), 0(1) | 1 | 3 |
| D C | 1(1), 1(0) | 0 | 1 |
| D D | 1(1), 1(1) | 0 | 1 |

Fig. 10b

| current state | quantization set for current coefficient | next state | |
|---|---|---|---|
| | | path 0 | path 1 |
| 0 | 0 | 0 | 2 |
| 1 | 0 | 2 | 0 |
| 2 | 1 | 1 | 3 |
| 3 | 1 | 3 | 1 |

Fig. 10c

```
state = 0
for( k = kstart; k >= 0; k-- )
{
    n = 2 * level[ k ] – ( setId[ state ] > 0 ? sign( level[ k ] ) : 0 )   } 62
    trec[ k ] = ( n * scale[ k ] + add ) >> shift                         }
    state = state_trans_table[ state ][ level[ k ] & 1 ]                  <- 54
}
```

Fig. 11

```
setId[4] = { 0, 0, 1, 1 }

state_trans_table[4][2] = { {0,2}, {2,0}, {1,3}, {3,1} }
```

Fig. 12

```
state = 0
for( k = kstart; k >= 0; k-- )
{
    if( level[ k ] != 0 )
    {
        n = 2 * level[ k ] – ( setId[ state ] > 0 ? sign( level[ k ] ) : 0 )   } 62
        trec[ k ] = ( n * scale[ k ] + add ) >> shift                         }
        state = state_trans_table[ state ][ level[ k ] & 1 ]
    }   else {
        trec[ k ] = 0
    }
}
```

Fig. 13

| absolute value for the level | unary binarization | Exp-Golomb binarization | concatenated unary and Exp-Golomb | binarization (using a **bin** for the path) |
|---|---|---|---|---|
| 0 | 0 | 0 | 0 | 0 |
| 1 | 1 0 | 1 0 0 | 1 0 | 1 0 |
| 2 | 1 1 0 | 1 0 1 | 1 1 0 | 1 1 **0** 0 |
| 3 | 1 1 1 0 | 1 1 0 0 0 | 1 1 1 0 0 | 1 1 **1** 0 |
| 4 | 1 1 1 1 0 | 1 1 0 0 1 | 1 1 1 0 1 | 1 1 1 **0** 1 0 0 |
| 5 | 1 1 1 1 1 0 | 1 1 0 1 0 | 1 1 1 1 0 0 0 | 1 1 1 **1** 0 0 |
| 6 | 1 1 1 1 1 1 0 | 1 1 0 1 1 | 1 1 1 1 0 0 1 | 1 1 1 1 **0** 1 0 1 |
| 7 | 1 1 1 1 1 1 1 0 | 1 1 1 0 0 0 0 | 1 1 1 1 0 1 0 | 1 1 1 1 **1** 1 0 1 |
| ⋮ | ⋮ | ⋮ | ⋮ | ⋮ |

DEPENDENT QUANTIZATION

CROSS-REFERENCE TO RELATED APPLICATIONS

This application is a continuation of U.S. application Ser. No. 17/033,197 filed Sep. 25, 2020, which is a continuation of Patent Cooperation Treaty Application No. PCT/EP2019/057818 filed Mar. 28, 2019, which claims priority to European Application No. 18165210.8 filed Mar. 29, 2018, all of which are incorporated herein by reference in their entirety.

BACKGROUND OF THE INVENTION

The present application is concerned with media signal coding such as video coding and, especially, lossy codecs using quantization in encoding the media signal such as, for instance, for quantizing a prediction residual as done, for instance, in HEVC.

In setting a quantization parameter, the encoder has to make a compromise. Rendering the quantization coarse reduces the bitrate, but increases the quantization distortion, and rendering the quantization finer decreases the distortion, but increases the bitrate. It would be favorable to have a concept at hand which increases the coding efficiency for a given domain of available quantization levels.

It is the object of the present invention to provide a concept for coding a media signal using quantization which achieves such an increase in coding efficiency at a given set of available quantization levels.

SUMMARY

An embodiment may have an apparatus for decoding a media signal from a data stream, configured to sequentially decode a sequence of samples which describe the media signal by selecting, for a current sample, a set of reconstruction levels out of a plurality of reconstruction level sets depending on quantization indices decoded from the data stream for previous samples of the sequence of samples, entropy decoding a quantization index for the current sample from the data stream, wherein the quantization index indicates one reconstruction level out of the selected set of reconstruction levels for the current sample, dequantizing the current sample onto the one reconstruction level of the selected set of reconstruction levels that is indicated by the quantization index for the current sample.

According to another embodiment, a method for decoding a media signal from a data stream may have the step of: sequentially decoding a sequence of samples which describe the media signal by selecting, for a current sample, a set of reconstruction levels out of a plurality of reconstruction level sets depending on quantization indices decoded from the data stream for previous samples of the sequence of samples, entropy decoding a quantization index for the current sample from the data stream, wherein the quantization index indicates one reconstruction level out of the selected set of reconstruction levels for the current sample, dequantizing the current sample onto the one reconstruction level of the selected set of reconstruction levels that is indicated by the quantization index for the current sample.

Another embodiment may have an apparatus for encoding a media signal into a data stream, configured to sequentially encode a sequence of samples which describe the media signal by selecting, for a current sample, a set of reconstruction levels out of a plurality of reconstruction level sets depending on quantization indices encoded into the data stream for previous samples of the sequence of samples, quantizing the current sample onto one reconstruction level of the set of reconstruction levels, and encoding a quantization index which indicates the one reconstruction level out of the selected set of reconstruction levels for the current sample into the data stream.

According to another embodiment, a method for encoding a media signal into a data stream may have the steps of: sequentially encoding a sequence of samples which describe the media signal by selecting, for a current sample, a set of reconstruction levels out of a plurality of reconstruction level sets depending on quantization indices encoded into the data stream for previous samples of the sequence of samples, quantizing the current sample onto one reconstruction level of the set of reconstruction levels, and encoding a quantization index which indicates the one reconstruction level out of the selected set of reconstruction levels for the current sample into the data stream.

Still another embodiment may have a non-transitory digital storage medium having stored thereon a computer program for performing a method for decoding a media signal from a data stream having the steps of: sequentially decoding a sequence of samples which describe the media signal by selecting, for a current sample, a set of reconstruction levels out of a plurality of reconstruction level sets depending on quantization indices decoded from the data stream for previous samples of the sequence of samples, entropy decoding a quantization index for the current sample from the data stream, wherein the quantization index indicates one reconstruction level out of the selected set of reconstruction levels for the current sample, dequantizing the current sample onto the one reconstruction level of the selected set of reconstruction levels that is indicated by the quantization index for the current sample, when said computer program is run by a computer.

Another embodiment may have a non-transitory digital storage medium having stored thereon a computer program for performing a method for encoding a media signal into a data stream having the steps of: sequentially encoding a sequence of samples which describe the media signal by selecting, for a current sample, a set of reconstruction levels out of a plurality of reconstruction level sets depending on quantization indices encoded into the data stream for previous samples of the sequence of samples, quantizing the current sample onto one reconstruction level of the set of reconstruction levels, and encoding a quantization index which indicates the one reconstruction level out of the selected set of reconstruction levels for the current sample into the data stream, when said computer program is run by a computer.

Another embodiment may have a data stream generated using an inventive method for encoding as mentioned above.

The present application is based on the finding that the coding of a media signal may be rendered more efficient by describing the media signal using a sequence of samples and sequentially encoding this sequence by selecting, for a current sample, a set, such as a countable set, of quantization levels, also called reconstruction levels, out of a plurality of quantization level sets depending on indices encoded into the data stream for previous samples of the sequence of samples, quantizing the current sample onto one level of the set of quantization levels, and encoding a quantization index to the one level for the current sample into the data stream. In other words, scalar quantization of the individual samples of the sequence of samples is used, but it is rendered dependent on quantization indices encoded into the data stream for previous samples of the sequence of samples. By this measure, it is possible to "construe" a grid of quantization points in the multi-dimensional space across which all possible settings of the sequence of samples are spread, onto which quantizations of the samples are quantized according to the sequence of quantization indices coded into the data stream. This grid, in turn, reduces, statistically, a quantization mean error.

In accordance with an embodiment, the media signal is a two-dimensional signal, such as a picture, and a sequence of samples is obtained by use of some scanning pattern which turns the two-dimensional spatial arrangement of the samples into a one-dimensional sequence along which, then, the construction of the aforementioned quantization point grid takes place.

In accordance with an embodiment, the sequence of samples which describe the media signal represents a transform block of a picture or a portion thereof, i.e., it is obtained via transforming a transform block of the picture, i.e. a picture block or block of spatial samples such as residual samples of a predictor, into a transform coefficient block wherein predetermined transform coefficients of the transform coefficient block, scanned along a predetermined coefficient scan, form the sequence of samples. The transformation may be a linear transformation or any other transformation, and for reconstruction purposes, the inverse transformation or some other reverse transformation approximating the inverse may be used. Additionally or alternatively, the sequence of samples may represent a prediction residual.

In accordance with an embodiment, the selection of the set of quantization levels for the current sample depends on a least significant bit portion such as merely a parity of the quantization indices encoded into the data stream for previous samples of the sequence of samples. In particular, in accordance with an embodiment, the number of quantization level sets of the plurality of quantization level sets from which the selection takes place is two. Additionally or alternatively, the selection out of the plurality of quantization level sets may depend on a parity of the previous quantization indices. In particular, a fixed construction rule may be used for the selection for the samples which selects one out of the plurality of quantization level sets depending on the quantization indices coded for a predetermined fixed number of immediately preceding samples of the sequence of samples. In accordance with an example, a state transition process or state machine is used to this end which comprises a set of states and transitions from one state for one sample to a state for the next sample in the sequence of samples, the state transitioning from one state to the next depending on the quantization index for the one sample such as the parity thereof. Each state uniquely determines the set of quantization levels to be used for the sample the respective state is associated with. A predetermined state setting may be applied at encoder and decoder for an initial state using which the state transitioning is commenced. For instance, this predetermined number may be two and the cardinality of the plurality of quantization level sets may also be two. As just-mentioned, the dependency may merely relate to the parity of the number of quantization indices. This results into an easy implementation at improved coding efficiency.

Favorably, and in accordance with an embodiment of the present application, the plurality of quantization level sets is parameterized by way of a predetermined quantization step size and information on the predetermined quantization step size is signaled in the data stream. In case of the sequence of samples representing transform coefficients of a transform block, for each transform coefficient (sample) an own quantization step size for parameterizing the plurality of quantization level sets may be determined. For instance, the quantization step sizes for the transform coefficients of a transform block may be related to one signaled quantization step size signaled in the data stream in a predetermined manner. For instance, one quantization step size may be signaled in the data stream for the whole transform block and be individually scaled for each transform coefficient according to a scale factor which is set by default or also coded in the data stream.

Accordingly, advantageously, the dependent scalar quantization used herein allows for a combination of this dependent scalar quantization with a concept of using a weighting matrix for weighting the scaling factor across transform coefficients of a transform block.

The selected quantization level set may be taken to account in entropy coding an absolute value of the quantization index. Additionally, context dependency may include a dependency on quantization levels for preceding samples of the sequence of samples such as in a local neighborhood of the current sample.

BRIEF DESCRIPTION OF THE DRAWINGS

Embodiments of the present application are described below with respect to the figures among which:

FIG. 10*b* shows a table as an example for the determination of the quantization set (set of available reconstruction levels) that is used for the next transform coefficient based on the subsets that are associated with the two last quantization indexes. The subsets are shown in the left table column; they are uniquely determined by the used quantization set (for the two last quantization indexes) and the so-called path (which may be determined by the parity of the quantization index). The quantization set and, in parenthesis, the path for the subsets are listed in the second column form the left. The third column specifies the associated quantization set. In the last column, the value of a so-called state variable is shown, which can be used for simplifying the process for determining the quantization sets;

FIG. 10*c* shows a state transition table as a further example as to how to switch between the available quantization sets, here for a configuration with 4 states;

FIG. 11 shows a pseudo-code illustrating an example for the reconstruction process of transform coefficients for a transform block. The array level represents the transmitted transform coefficient levels (quantization indexes) for the transform block and the array trec represent the corresponding reconstructed transform coefficients. The 2d table state trans table specifies the state transition table and the table setId specifies the quantization set that is associated with the states;

FIG. 12 shows examples for the state transition table state trans table and the table setId, which specifies the quantization set associated with the states. The table given in C-style syntax represents the tables specified in the table of FIG. 10*c;*

FIG. 13 shows a pseudo-code illustrating an alternative reconstruction process for transform coefficient levels, in which quantization index equal to 0 are excluded from the state transition and dependent scalar quantization;

DETAILED DESCRIPTION OF THE INVENTION

The following description describes a concept for media signal coding using dependent scalar quantization. For ease of understanding, however, concrete examples set forth below relate to transform coding of transform coefficients using dependent scalar quantization. As mentioned below, the embodiments of the present application are, however, not restricted to transform coding.

In accordance with the embodiments described next, transform coding involves a transform of a set of samples, a dependent scalar quantization of the resulting transform coefficients, and an entropy coding of the obtained quantization indices. At the decoder side, the set of reconstructed samples is obtained by entropy decoding of the quantization indices, a dependent reconstruction of transform coefficients, and an inverse transform. In contrast to conventional transform coding which consists of a transform, independent scalar quantization and entropy coding, the set of admissible reconstruction levels for a transform coefficient depends on the transmitted quantization indices which are also referred to as transform coefficient levels that precede the current transform coefficient in reconstruction order. Additionally, entropy coding of quantization indices, i.e., transform coefficient levels, that specify the reconstruction levels used in dependent scalar quantization are described. Even further, an adaptive selection between conventional transform coding and transform coding with dependent scalar quantization and concepts for adapting the quantization step size used for dependent scalar quantization are described. The following description mainly targets on lossy coding of blocks of prediction error samples in image and video codecs, but it is noted that the embodiments described below may also be applied to other areas of lossy coding such as, for instance, audio coding or the like. That is, the embodiments described below are not restricted to sets of samples that form rectangular blocks and are not restricted to sets of samples that represent prediction error samples, i.e., differences between an original and a prediction signal. Rather, the embodiments described below may readily be transferred to other scenarios such as audio signal coding, coding without prediction or coding in spatial domain rather than transform domain.

All state-of-the-art video codecs, such as the international video coding standards H.264|MPEG-4 AVC [1] and H.265|MPEG-H HEVC [2] follow the basic approach of hybrid video coding. The video pictures are partitioned into blocks, the samples of a block are predicted using intra-picture prediction or inter-prediction, and the samples of the resulting prediction error signal (difference between the original samples and the samples of the prediction signal) are coded using transform coding.

Figure 1:
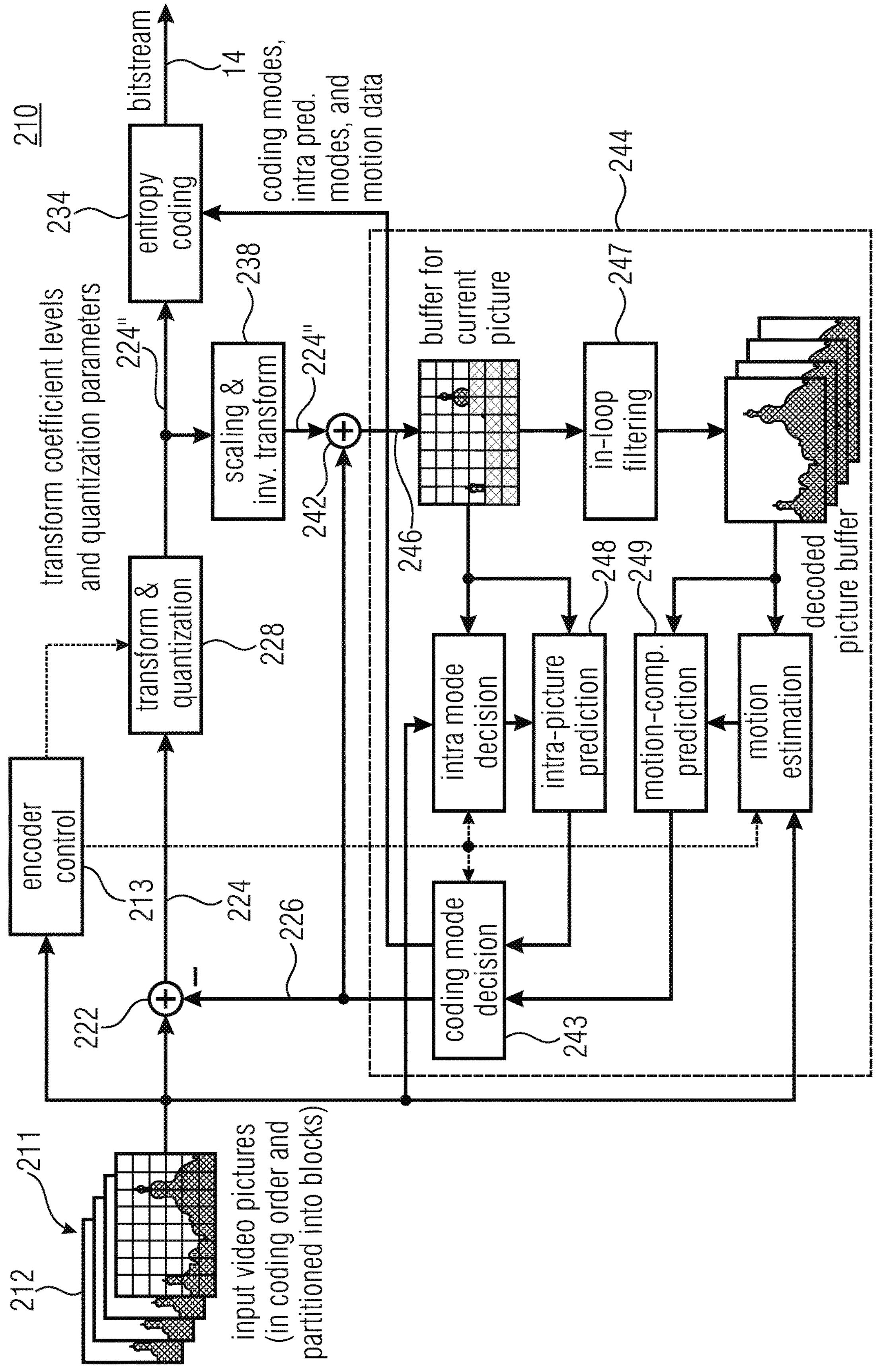
FIG. 1 shows a block diagram of an exemplary video encoder as an example for a picture encoder which may be embodied to operate in accordance with any of the embodiments described below.

FIG. 1 shows a simplified block diagram of a typical modern video encoder. The video pictures of a video sequence are coded in a certain order, which is referred to as coding order. The coding order of pictures can differ from the capture and display order. For the actual coding, each video picture is partitioned into blocks. A block comprises the samples of a rectangular area of a particular color component. The entity of the blocks of all color components that correspond to the same rectangular area is often referred to as unit. Depending on the purpose of the block partitioning, in H.265|MPEG-H HEVC, it is differentiated between coding tree blocks (CTBs), coding blocks (CBs), prediction blocks (PBs), and transform blocks (TBs). The associated units are referred to as coding tree units (CTUs), coding units (CUs), prediction units (PUs), and transform units (TUs).

Typically, a video picture is initially partitioned into fixed sized units (i.e., aligned fixed sized blocks for all color components). In H.265|MPEG-H HEVC, these fixed sized units are referred to as coding tree units (CTUs). Each CTU can be further split into multiple coding units (CUs). A coding unit is the entity for which a coding mode (for example, intra- or inter-picture coding) is selected. In H.265|MPEG-H HEVC, the decomposition of a CTU into one or multiple CUs is specified by a quadtree (QT) syntax and transmitted as part of the bitstream. The CUs of a CTU are processed in the so-called z-scan order. That means, the four blocks that result from a split are processed in raster-scan order; and if any of the blocks is further partitioned, the corresponding four blocks (including the included smaller blocks) are processed before the next block of the higher splitting level is processed.

If a CU is coded in an intra coding mode, an intra prediction mode for the luma signal and, if the video signal includes chroma components, another intra prediction mode for the chroma signals is transmitted. In ITU-T H.265|MPEG-H HEVC, if the CU size is equal to the minimum CU size (as signaled in the sequence parameter set), the luma block can also be split into four equally sized blocks, in which case, for each of these blocks, a separate luma intra prediction mode is transmitted. The actual intra prediction and coding is done on the basis of transform blocks. For each transform block of an intra-picture coded CU, a prediction signal is derived using already reconstructed samples of the same color component. The algorithm that is used for generating the prediction signal for the transform block is determined by the transmitted intra prediction mode.

CUs that are coded in inter-picture coding mode can be further split into multiple prediction units (PUs). A prediction unit is the entity of a luma and, for color video, two associated chroma blocks (covering the same picture area), for which a single set of prediction parameters is used. A CU can be coded as a single prediction unit, or it can be split into two non-square (symmetric and asymmetric splittings are supported) or four square prediction units. For each PU, an individual set of motion parameters is transmitted. Each set of motion parameters includes the number of motion hypotheses (one or two in H.265|MPEG-H HEVC) and, for each motion hypothesis, the reference picture (indicated via a reference picture index into a list of reference pictures) and the associated motion vector. In addition, H.265|MPEG-H HEVC provides a so-called merged mode, in which the motion parameters are not explicitly transmitted, but derived based on motion parameters of spatial or temporal neighboring blocks. If a CU or PU is coded in merge mode, only an index into a list of motion parameter candidates (this list is derived using motion data of spatial and temporal neighboring blocks) is transmitted. The index completely determines the set of motion parameters used. The prediction signal for inter-coded PUs is formed by motion-compensated prediction. For each motion hypothesis (specified by a reference picture and a motion vector), a prediction signal is formed by a displaced block in the specified reference picture, where the displacement relative to the current PU is specified by the motion vector. The displacement is typically specified with sub-sample accuracy (in H.265|MPEG-H HEVC, the motion vectors have a precision of a quarter luma sample). For non-integer motion vectors, the prediction signal is generated by interpolating the reconstructed reference picture (typically, using separable FIR filters). The final prediction signal of PUs with multi-hypothesis prediction is formed by a weighted sum of the prediction signals for the individual motion hypothesis. Typically, the same set of motion parameters is used for luma and chroma blocks of a PU. Even though state-of-the-art video coding standards use translational displacement vectors for specifying the motion of a current area (block of samples) relative to a reference picture, it is also possible to employ higher-order motion models (for example, the affine motion model). In that case, additional motion parameters have to be transmitted for a motion hypothesis.

For both intra-picture and inter-picture coded CUs, the prediction error signal (also called residual signal) is typically transmitted via transform coding. In H.265|MPEG-H HEVC, the block of luma residual samples of a CU as well as the blocks of chroma residual samples (if present) are partitioned into transform blocks (TBs). The partitioning of a CU into transform block is indicated by a quadtree syntax, which is also referred to as residual quadtree (RQT). The resulting transform blocks are coded using transform coding: A 2d transform is applied to the block of residual samples, the resulting transform coefficients are quantized using independent scalar quantization, and the resulting transform coefficient levels (quantization indexes) are entropy coded. In P and B slices, at the beginning of the CU syntax, a skip_flag is transmitted. If this flag is equal to 1, it indicates that the corresponding CU consists of a single prediction unit coded in merge mode (i.e., merge_flag is inferred to be equal to 1) and that all transform coefficients are equal to zero (i.e., the reconstruction signal is equal to the prediction signal). In that case, only the merge_idx is transmitted in addition to the skip_flag. If skip_flag is equal to 0, the prediction mode (inter or intra) is signaled, followed by the syntax features described above.

Since already coded pictures can be used for motion-compensated prediction of blocks in following pictures, the pictures have to be fully reconstructed in the encoder. The reconstructed prediction error signal for a block (obtained by reconstructing the transform coefficients given the quantization indexes and an inverse transform) is added to the corresponding prediction signal and the result is written to a buffer for the current picture. After all blocks of a picture are reconstructed, one or more in-loop filters can be applied (for example, a deblocking filter and a sample adaptive offset filter). The final reconstructed picture is then stored in a decoded picture buffer.

In the following, a new concept for transform coding of prediction error signals is described. The concept is applicable for both intra-picture and inter-picture coded blocks. It is also applicable to transform coding of non-rectangular sample regions. In contrast to conventional transform coding, the transform coefficients are not independently quantized. Instead, the set of available reconstruction levels for a particular transform coefficient depends on the chosen quantization indexes for other transform coefficients. Further, modifications for the entropy coding of quantization indexes, which increase the coding efficiency when combined with dependent scalar quantization are described.

All major video coding standards, including the state-of-the-art standard H.265|MPEG-H HEVC, discussed above utilize the concept of transform coding for coding blocks of prediction error samples. The prediction error samples of a block represent the differences between the samples of the original signal and the samples of a prediction signal for the block. The prediction signal is either obtained by intra-picture prediction (in which case the samples of the prediction signal for a current block are derived based on already reconstructed samples of neighboring blocks inside the same picture) or by inter-picture prediction (in which case the samples of the prediction signal are derived based on samples of already reconstructed pictures). The samples of the original prediction error signal are obtained by subtracting the values of the samples of the prediction signal from the samples values of the original signal for the current block.

Figure 2A:
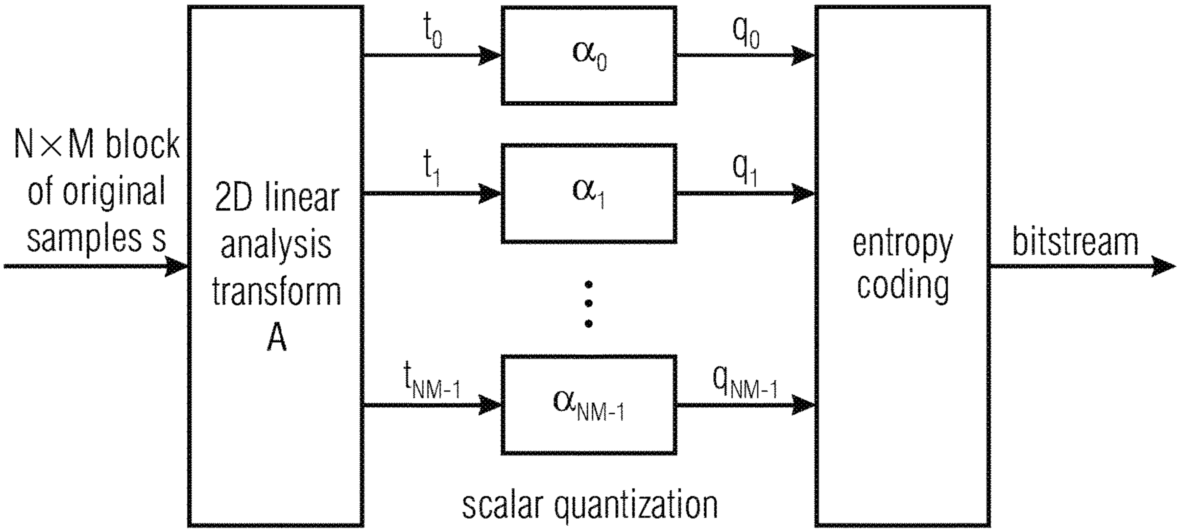
FIG. 2*a* shows a block diagram of (a) a transform encoder.

Transform coding of sample blocks may consist of a linear transformation, scalar quantization, and entropy coding of the quantization indexes. At the encoder side (see FIG. 2*a*), an N×M block of original samples is transformed using a linear analysis transform A. The result is an N×M block of transform coefficients. The transform coefficients $t_k$ represent the original prediction error samples in a different signal space (or different coordinate system). The N×M transform coefficients are quantized using N×M independent scalar quantizers. Each transform coefficient $t_k$ is mapped to a quantization index $q_k$, which is also referred to as transform coefficient level. The obtained quantization indexes $q_k$ are entropy coded and written to the bitstream.

Figure 2B:
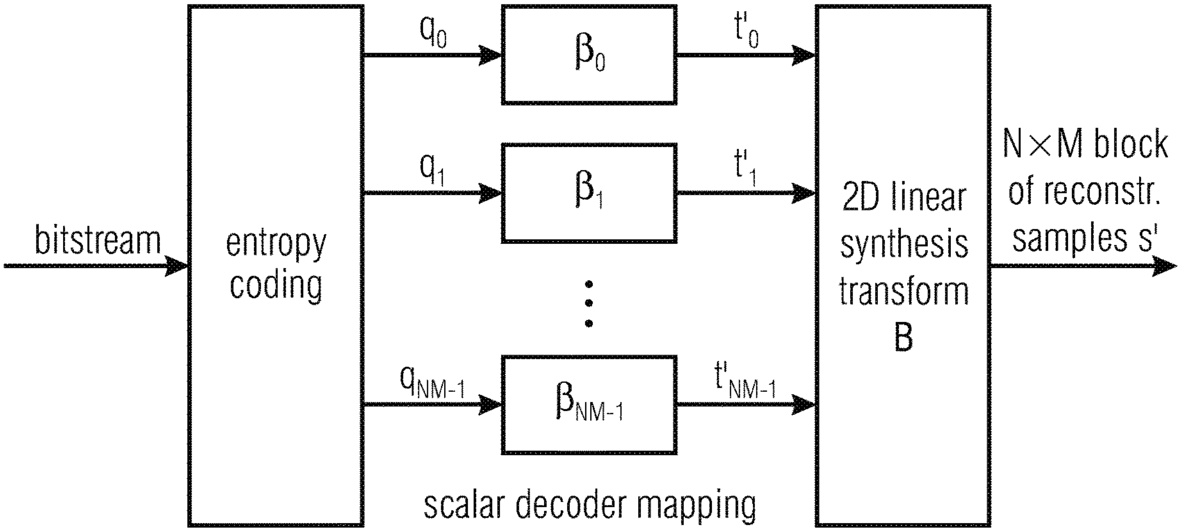
FIG. 2*b* shows a transform decoder to illustrate a basic approach of block-based transform coding.

At the decoder side (see FIG. 2*b*), the transform coefficient levels $q_k$ are decoded from the received bitstream. Each transform coefficient level $q_k$ is mapped to a reconstructed transform coefficient $t'_k$. The N×M block of reconstructed samples is obtained by transforming the block of reconstructed transform coefficients using a linear synthesis transform B.

Even though video coding standards only specify the synthesis transform B, it is common practice that the inverse of the synthesis transform B is used as analysis transform A in an encoder, i.e., $A=B^{-1}$. Moreover, the transforms used in practical video coding systems represent orthogonal transforms ($B^{-1}=B^T$) or nearly orthogonal transforms. For orthogonal transforms, the mean squared error (MSE) distortion in the signal space is equal to the MSE distortion in the transform domain. The orthogonality has the important advantage that the MSE distortion between an original and reconstructed sample block can be minimized using independent scalar quantizers. Even if the actual quantization process used in an encoder takes dependencies between transform coefficient levels (introduced by the entropy coding, see below) into account, the usage of orthogonal transforms significantly simplifies the quantization algorithm.

For typical prediction error signals, the transform has the effect that the signal energy is concentrated in a few transform coefficients. In comparison to the original prediction error samples, the statistical dependencies between the resulting transform coefficients are reduced.

In state-of-the-art video coding standards, a separable discrete cosine transform (type II) or an integer approximation thereof is used. The transform can, however, be easily replaced without modifying other aspects of the transform coding system. Examples for improvements that have been suggested in the literature or in standardization documents include:

Usage of discrete sine transform (DST) for intra-picture predicted blocks (possibly depending on the intra prediction mode and/or the block size). Note that H.265|MPEG-H HEVC already includes a DST for intra-picture predicted 4×4 transform blocks.

Switched transforms: The encoder selects the actually used transform among a set of pre-defined transforms. The set of available transforms is known by both the encoder and the decoder, so that it can be efficiently signaled using an index into a list of available transforms. The set of available transforms and their ordering in a list can depend on other coding parameters for the block, such as the chosen intra prediction mode. In a special case, the used transform is completely determined by coding parameters such as the intra prediction mode and/or the block shape, so that no syntax element for specifying the transform needs to be transmitted.

Non-separable transforms: The transforms used in encoder and decoder represent non-separable transforms. Note that the concept of switched transforms may include one or more non-separable transforms. Due to complexity reasons, the usage of non-separable transforms can be restricted to certain block sizes.

Multi-level transforms: The actual transform is composed of two or more transform stages. The first transform stage could consist of a computationally low-complex separable transform. And in the second stage a subset of the resulting transform coefficients is further transformed using a non-separable transform. It comparison to a non-separable transform for the entire transform block, the two-stage approach has the advantage that the more complex non-separable transform is applied to a smaller number of samples. The concept of multi-level transforms can be efficiently combined with the concept of switched transforms.

The transform coefficients are quantized using scalar quantizers. As a result of the quantization, the set of admissible values for the transform coefficients is reduced. In other words, the transform coefficients are mapped to a countable set (in practice, a finite set) of so-called reconstruction levels. The set of reconstruction levels represents a proper subset of the set of possible transform coefficient values. For simplifying the following entropy coding, the admissible reconstruction levels are represented by quantization indexes (also referred to as transform coefficient levels), which are transmitted as part of the bitstream. At the decoder side, the quantization indexes (transform coefficient levels) are mapped to reconstructed transform coefficients. The possible values for the reconstructed transform coefficients correspond to the set of reconstruction levels. At the encoder side, the result of scalar quantization is a block of transform coefficient levels (quantization indexes).

Figure 3:
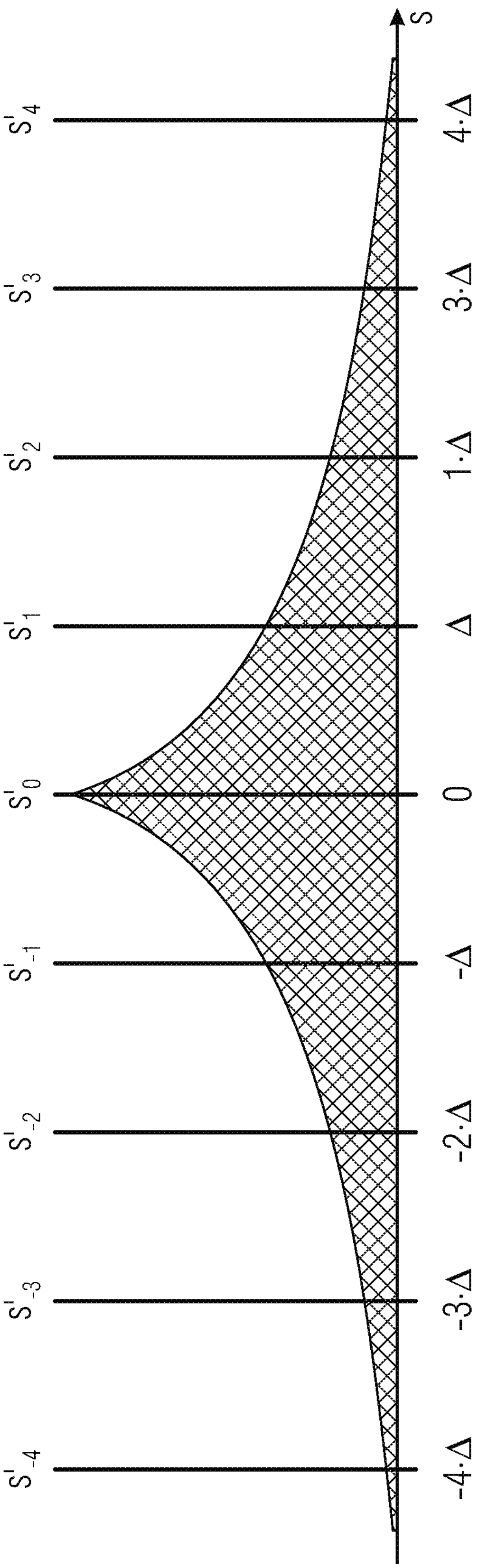
FIG. 3 shows a histogram of a distribution illustrating a uniform reconstruction quantizer.

In state-of-the-art video coding standards, uniform reconstruction quantizers (URQs) are used. Their basic design is illustrated in FIG. 3. URQs have the property that the reconstruction levels are equally spaced. The distance A between two neighboring reconstruction levels is referred to as quantization step size. One of the reconstruction levels is equal to 0. Hence, the complete set of available reconstruction levels is uniquely specified by the quantization step size Δ. The decoder mapping of quantization indexes q to reconstructed transform coefficients t' is, in principle, given by the simple formula $$t'=q\cdot\Delta.$$

In this context, the term "independent scalar quantization" refers to the property that, given the quantization index q for any transform coefficient, the associated reconstructed transform coefficient t' can be determined independently of all quantization indexes for the other transform coefficients.

Since video decoders typically utilize integer arithmetic with standard precision (e.g., 32 bits), the actual formula used in the standard can slightly differ from the simple multiplication. When neglecting the clipping to the supported dynamic range for the transform coefficients, the reconstructed transform coefficients in H.265|MPEG-H HEVC are obtained by $$t'=(\text{scale}\cdot q+(1<<(\text{shift}-1)))>>\text{shift},$$

where the operators "<<" and ">>" represent bit shifts to the left and right, respectively. When we ignore the integer arithmetic, the quantization step size Δ corresponds to the term $$\Delta=\text{scale}\cdot 2^{-shift}.$$

Older video coding standards, such as H.262|MPEG-2 Video, also specify modified URQs for which the distances between the reconstruction level zero and the first non-zero reconstruction levels are increased relative to the nominal quantization step size (e.g., to three halves of the nominal quantization step size Δ).

The quantization step size (or the scale and shift parameters) for a transform coefficient is determined by two factors:

Quantization Parameter QP:

The quantization step size can typically be modified on a block basis. For that purpose, video coding standards provide a predefined set of quantization step sizes. The used quantization step size (or, equivalently the parameters "scale" and "shift" introduced above) is indicated using an index into the predefined list of quantization step sizes. The index is called quantization parameter (QP). In H.265|MPEG-H HEVC, the relationship between QP and the quantization step size is approximately given by $$\Delta\approx const\cdot 2\frac{QP}{6}.$$

A slice QP is typically transmitted in the slice header. In general, it is possible to modify the quantization parameter QP on the basis of blocks. For that purpose, a DQP (delta quantization parameter) can be transmitted. The used quantization parameter is determined by the transmitted DQP and a predicted QP value, which is derived using the QPs of already coded (typically neighboring) blocks.

Quantization Weighting Matrix:

Video coding standards often provide the possibility to use different quantization step sizes for individual transform coefficients. This is achieved by specifying so-called quantization weighting matrices w, which can be selected by the encoder, typically on a sequence or picture level, and are transmitted as part of the bitstream. A quantization weighting matrix w has the same size as the corresponding block of transform coefficients. The quantization step size $\Delta_{ik}$ for a transform coefficient $t_{ik}$ is given by $$\Delta_{ik}=w_{ik}\cdot\Delta_{block},$$

where $\Delta_{block}$ denotes the quantization step size (indicated by the block quantization parameter QP) for the considered block, i and k represent the coordinates specifying the current transform coefficient inside the transform block, and $w_i k$ represents the corresponding entry in the quantization weighting matrix w.

The main intention of quantization weighting matrices is to provide a possibility for introducing the quantization noise in a perceptual meaningful way. By using appropriate weighting matrices, the spatial contrast sensitivity of human vision can be exploited for achieving a better trade-off between bit rate and subjective reconstruction quality. Nonetheless, many encoders use a so-called flat quantization matrix (which can be efficiently transmitted using high-level syntax elements). In this case, the same quantization step size Δ is used for all transform coefficients in a block. The quantization step size is then completely specified by the quantization parameter QP.

The block of transform coefficient levels (quantization indexes for the transform coefficients) are entropy coded (i.e., it is transmitted in a lossless manner as part of the bitstream). Since the linear transform can only reduce linear dependencies, the entropy coding for the transform coefficient levels is typically designed in a way that remaining non-linear dependencies between transform coefficient levels in a block can be exploited for an efficient coding. Well known examples are the run-level coding in MPEG-2 Video, the run-level-last coding in H.263 and MPEG-4 Visual, the context-adaptive variable length coding (CAVLC) in H.264|MPEG-4 AVC, and context-based adaptive binary arithmetic coding (CABAC) in H.264|MPEG-4 AVC and H.265|MPEG-H HEVC.

Figure 4A:
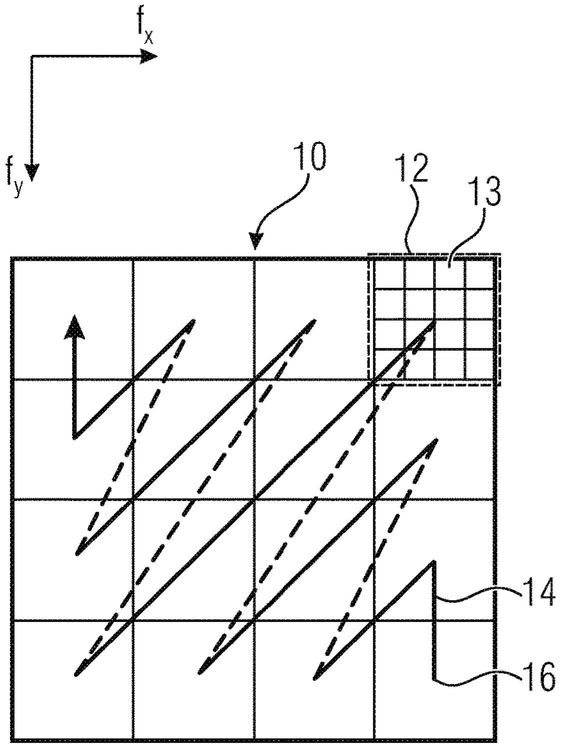
FIG. 4*a* shows a schematic diagram of a transform block subdivided into subblocks; in particular, it shows a partitioning of a 16×16 transform block into 4×4 subblocks and the coding order of subblocks.

The CABAC specified in the state-of-the-art video coding standard H.265|MPEG-H HEVC follows a generic concept that can be applied for a large variety of transform block sizes. Transform blocks that are larger than 4×4 samples, such as 10 in FIG. 4*a*, are partitioned into 4×4 subblocks 12. The partitioning is illustrated in FIG. 4*a* for the example of a 16×16 transform block 10. The coding order of the 4×4 subblocks as well as the coding order of the transform coefficient levels inside a subblock are, in general, specified by the reverse diagonal scan 14 shown in FIG. 4*a*. For certain intra-picture predicted blocks, a horizontal or vertical scan pattern in used (depending on the actual intra prediction mode). The coding order starts with high-frequency locations.

In H.265|MPEG-H HEVC, the transform coefficient levels are transmitted on the basis of 4×4 subblocks. The lossless coding of transform coefficient levels includes the following steps:

1. A syntax element coded_block_flag is transmitted, which signals whether there are any non-zero transform coefficient levels in the transform block. If coded_block_flag is equal to 0, no further data are coded for the transform block.

Figure 4B:
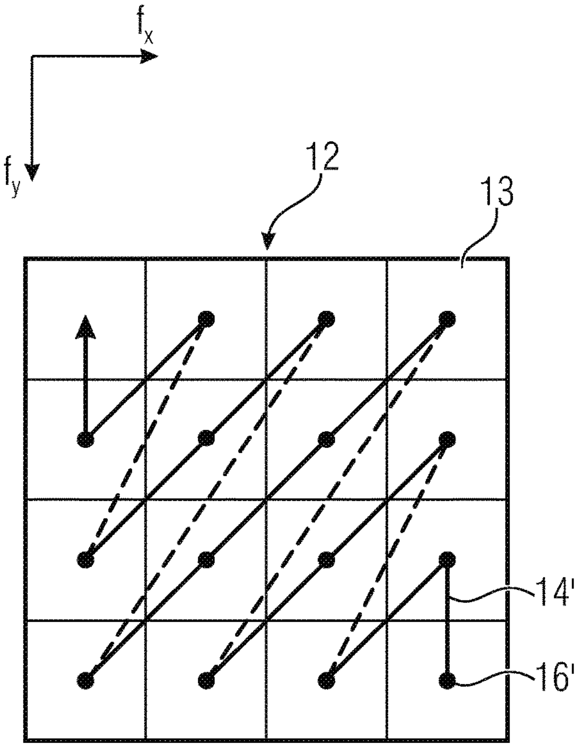
FIG. 4*b* shows a schematic diagram of a subblock in order to illustrate an example for scanning of transform coefficient levels, here exemplarily one used in H.265|MPEG-H HEVC; in particular, it shows the coding order of transform coefficient levels inside a 4×4 subblock.

2. The x and y coordinates of the first non-zero transform coefficient level in coding order (e.g., the block-wise reverse diagonal scan order illustrated in FIGS. 4*a*, 4*b*) are transmitted. The transmission of the coordinates is split into a prefix and suffix part. The standard uses the syntax elements last_sig_coeff_x_prefix, last_sig_coeff_y_prefix, last_sig_coeff_x_suffix, and last_sig_coeff_x_suffix.

3. Starting with the 4×4 subblock that contains the first non-zero transform coefficient level in coding order, the 4×4 subblocks are processed in coding order, where the coding of a subblock includes the following main steps:

a. A syntax element coded_sub_block_flag is transmitted, which indicates whether the subblock contains any non-zero transform coefficient levels. For the first and last 4×4 subblock (i.e., the subblocks that contain the first non-zero transform coefficient level or the DC level), this flags is not transmitted but inferred to be equal to one.

b. For all transform coefficient levels inside a subblock with coded_sub_block_flag equal to one, the syntax element significant_coeff_flag indicates whether the corresponding transform coefficient level is not equal to zero. This flag is only transmitted if its value cannot be inferred based on already transmitted data. In particular, the flag is not transmitted for the first significant scan position (specified by the transmitted x and y coordinates) and it is not transmitted for the DC coefficient if the DC coefficient is located in a different subblock than the first non-zero coefficient (in coding order) and all other significant_coeff_flags for the last subblock are equal to zero.

c. For the first eight transform coefficient levels with significant_coeff_flag equal to one (if any), the flag coeff_abs_level_greater1_flag is transmitted. It indicates whether the absolute value of the transform coefficient level is greater than one.

d. For the first transform coefficient level with coeff_abs_level_greater1_flag equal to one (if any), the flag coeff_abs_level_greater2_flag is transmitted. It indicates whether the absolute value of the transform coefficient level is greater than two.

e. For all levels with significant_coeff_flag equal to one (an exception is described below), the syntax element coeff_sign_flag is transmitted, which specifies the sign of the transform coefficient level.

f. For all transform coefficient levels for which the absolute value is not already completely specified by the values of significant_coeff_flag, coeff_abs_level_greater1_flag and coeff_abs_level_greater2_flag (the absolute value is completely specified if any of the transmitted flags is equal to zero), the remainder of the absolute value is transmitted using the multi-level syntax element coeff_abs_level_remaining.

In H.265|MPEG-H HEVC, all syntax elements are coded using context-based adaptive binary arithmetic coding (CABAC). All non-binary syntax elements are first mapped onto a series of binary decisions, which are also referred to as bins. The resulting bin sequence is coded using binary arithmetic coding. For that purpose, each bin is associated with a probability model (binary probability mass function), which is also referred to as a context. For most bins, the context represents an adaptive probability model, which means that the associated binary probability mass function is updated based on the actually coded bin values. Conditional probabilities can be exploited by switching the contexts for certain bins based on already transmitted data. CABAC also includes a so-called bypass mode, in which the fixed probability mass function (0.5, 0.5) is used.

The context that is chosen for the coding of the coded_sub_block_flag depends on the values of coded_sub_block_flag for already coded neighboring subblocks. The context for the significant_coeff_flag is selected based on the scan position (x and y coordinate) inside a subblock, the size of the transform block, and the values of coded_sub_block_flag in neighboring subblocks. For the flags coeff_abs_level_greater1_flag and coeff_abs_level_greater2_flag, the context selection depends on whether the current subblock includes the DC coefficient and whether any coeff_abs_level_greater1_flag equal to one has been transmitted for the neighboring subblocks. For the coeff_abs_level_greater1_flag, it further depends on the number and the values of the already coded coeff_abs_level_greater1_flag's for the subblock.

The signs coeff_sign_flag and the remainder of the absolute values coeff_abs_level_remaining are coded in the bypass mode of the binary arithmetic coder. For mapping coeff_abs_level_remaining onto a sequence of bins (binary decisions), an adaptive binarization scheme is used. The binarization is controlled by a single parameter (referred to as Rice parameter), which is adapted based on already coded values for the subblock.

H.265|MPEG-H HEVC also includes a so-called sign data hiding mode, in which (under certain conditions) the transmission of the sign for that last non-zero level inside a subblock is omitted. Instead, the sign for this level is embedded in the parity of the sum of the absolute values for the levels of the corresponding subblock. Note that the encoder has to consider this aspect in determining appropriate transform coefficient levels.

Video coding standards only specify the bitstream syntax and the reconstruction process. If we consider transform coding for a given block of original prediction error samples and given quantization step sizes, the encoder has a lot a freedom. Given the quantization indexes $q_k$ for a transform block, the entropy coding has to follow a uniquely defined algorithm for writing the data to the bitstream (i.e., constructing the arithmetic codeword). But the encoder algorithm for obtaining the quantization indexes $q_k$ given an original block of prediction error samples is out of the scope of video coding standards. Furthermore, the encoder has the freedom to select a quantization parameter QP on a block basis. For the following description, we assume that the quantization parameter QP and the quantization weighting matrix are given. Hence, the quantization step size for each transform coefficient is known. We further assume that the encoder performs an analysis transform that is the inverse (or a very close approximation of the inverse) of the specified synthesis transform for obtaining original transform coefficients $t_k$. Even under these conditions, the encoder has the freedom to select a quantizer index $q_k$ for each original transform coefficient $t_k$. Since the selection of transform coefficient levels determines both the distortion (or reconstruction/approximation quality) and the bit rate, the quantization algorithm used has a substantial impact on the rate-distortion performance of the produced bitstream.

The simplest quantization method rounds the original transform coefficients $t_k$ to the nearest reconstruction levels. For the typically used URQs, the corresponding quantization index $q_k$ can be determined according to $$q_k = \text{sgn}(t_k) \cdot \left\lfloor \frac{|t_k|}{\Delta_k} + \frac{1}{2} \right\rfloor,$$

where sgn( ) is the sign function and the operator XXX returns the largest integer that is smaller or equal to its argument. This quantization methods guarantees that the MSE distortion $$D = \sum_k D_k = \sum_k (t_k - q_k \cdot \Delta_k)^2$$

is minimized, but it completely ignores the bit rate that is used for transmitting the resulting transform coefficient levels $q_k$. Typically, better results are obtained if the rounding is biased towards zero:

$$q_k = \text{sgn}(t_k) \cdot \left\lfloor \frac{|t_k|}{\Delta_k} + a \right\rfloor \text{ with } 0 \le a \le \frac{1}{2}.$$

The best result in rate-distortion sense is obtained if the quantization process minimizes a Lagrangian function D+λ·R, where D represent the distortion (e.g., MSE distortion) of the transform block, R specifies the number of bits that are used for transmitting the transform coefficient levels of the block, and A is a Lagrange multiplier. For codecs that use the relationship $$\Delta \approx const \cdot 2^{\frac{QP}{6}}$$

between QP and quantization step size (such as H.264|MPEG-4 AVC or H.265|MPEG-H HEVC), the following relationship between the Lagrange multiplier A and the block quantization parameter QP is often used $$\lambda = c_1 \cdot \Delta^2 = c_2 \cdot 2^{\frac{QP}{3}},$$

where $c_1$ and $c_2$ represent constant factors for a slice or picture.

Quantization algorithms that aim to minimize a Lagrange function D+λ·R of distortion and rate are also referred to as rate-distortion optimized quantization (RDOQ). If we measure the distortion using the MSE or a weighted MSE, the quantization indexes $q_k$ for a transform block should be determined in a way so that the following cost measure is minimized:

$$D + \lambda \cdot R = \sum_k \alpha_k \cdot (t_k - \Delta_k \cdot q_k)^2 + \lambda \cdot R(q_k | q_{k-1}, q_{k-2}, \ldots).$$

At this, the transform coefficient index k specifies the coding order (or scanning order) of transform coefficient levels. The term $R(q_k|q_{k-1}, q_{k-2}, \ldots)$ represents the number of bits (or an estimate thereof) that are used for transmitting the quantization index $q_k$. The condition illustrates that (due to the usage of combined or conditional probabilities) the number of bits for a particular transform coefficient level $q_k$ typically depends on the chosen values for preceding transform coefficient levels $q_{k-1}$, $q_{k-2}$, etc. in coding order. The factors $\alpha_k$ in the equation above can be used for weighting the contribution of the individual transform coefficients, e.g., for modelling the contrast sensitivity of human vision. In the following, we generally assume that all weightings factor $\alpha_k$ are equal to 1 (but the algorithm can be straightforwardly modified in a way that different weighting factors can be taken into account).

For the transform coefficient coding in H.265|MPEG-H HEVC, an accurate computation of the rate terms is very complicated, since most binary decisions are coded using adaptive probability models. But if we neglect some aspects of the probability model selection and ignore that the probability models are adapted inside a transform block, it is possible to design an RDOQ algorithm with reasonable complexity. The RDOQ algorithm implemented in the reference software for H.265|MPEG-H HEVC consists of the following basic processing steps:

1. For each scanning position k, a transform coefficient level $q_k$ is selected by minimizing the Lagrangian cost $D_k(q_k)+\Delta\cdot R_k(q_k)$ under the assumption that the level is not inferred to be equal to zero. $D_k(q_k)$ denotes the (weighted) squared error $D_k(q_k)=\alpha_k\,(t_k-\Delta_k\cdot q_k)^2$ and $R_k(q_k)$ represents an estimate of the number of bits used for transmitting $q_k$.

2. The flags coded_sub_block_flag for the 4×4 subblocks are determined by comparing the Lagrangian costs for the following two cases: (a) The transform coefficient levels selected in step 1 are used; (b) The syntax element coded_sub_block_flag is set equal to zero and, thus, all transform coefficient levels of the 4×4 subblock are set equal to zero.

3. The location of the first non-zero transform coefficient levels is determined by comparing the Lagrangian costs that are obtained by choosing one of the non-zero transform coefficient levels (after step 2) as first non-zero transform coefficient levels in coding order (the preceding transform coefficient levels are set equal to zero).

4. The coded_block_flag is determined by comparing the Lagrangian costs for the sequence of transform coefficient levels obtained after step 3 and the case that all transform coefficient levels inside the transform block are set equal to zero.

The following describes a modified concept for transform coding. A modification relative to conventional transform coding is that the transform coefficients are not independently quantized and reconstructed. Instead, the admissible reconstruction levels for a transform coefficient depend on the selected quantization indexes for the preceding transform coefficients in reconstruction order. The concept of dependent scalar quantization is combined with a modified entropy coding, in which the probability model selection (or, alternatively, the codeword table selection) for a transform coefficient depends on the set of admissible reconstruction levels.

Figure 5A:
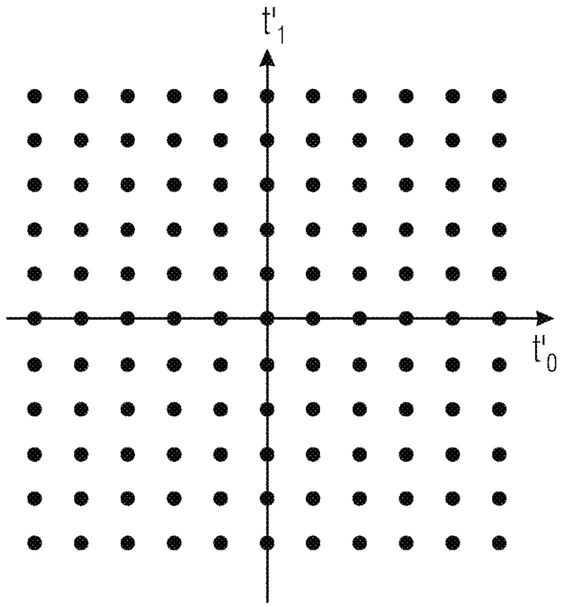
FIG. 5*a* shows a schematic diagram of a multi-dimensional output space spanned by one axis per transform coefficient, and the location of admissible reconstruction vectors for the simple case of two transform coefficients: (a) Independent scalar quantization.
Figure 5B:
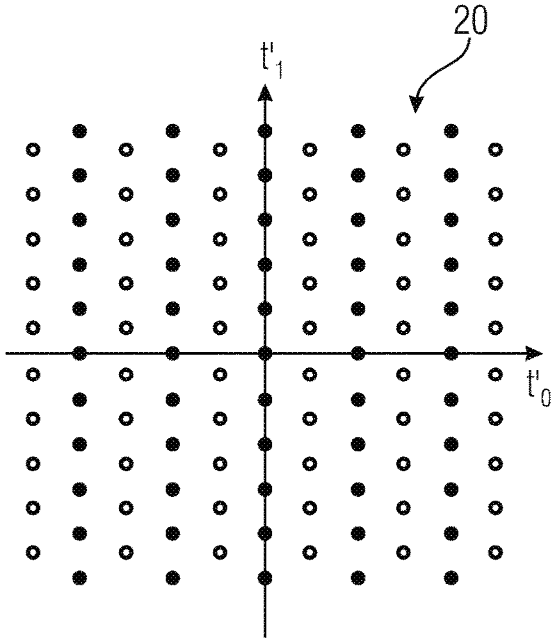
FIG. 5*b* shows an example for dependent scalar quantization.

The advantage of the dependent quantization of transform coefficients is that the admissible reconstruction vectors are denser packed in the N-dimensional signal space (where N denotes the number of samples or transform coefficients in a transform block). The reconstruction vectors for a transform block refer to the ordered reconstructed transform coefficients (or, alternatively, the ordered reconstructed samples) of a transform block. The effect of dependent scalar quantization is illustrated in FIG. 5*a* for the simplest case of two transform coefficients. FIG. 5*a* shows the admissible reconstruction vectors (which represent points in the 2d plane) for independent scalar quantization. As it can be seen, the set of admissible values for the second transform coefficient $t'_1$ does not depend on the chosen value for the first reconstructed transform coefficient $t'_0$. FIG. 5*b* shows an example for dependent scalar quantization. Note that, in contrast to independent scalar quantization, the selectable reconstruction values for the second transform coefficient $t'_1$ depend on the chosen reconstruction level for the first transform coefficient $t'_0$. In the example of FIG. 5*b*, there are two different sets of available reconstruction levels for the second transform coefficient $t'_1$ (illustrated by different colors). If the quantization index for the first transform coefficient $t'_0$ is even ( . . . , −2, 0, 2, . . . ), any reconstruction level of the first set (blue points) can be selected for the second transform coefficient $t'_1$. And if the quantization index for the first transform coefficient to is odd ( . . . , −3, −1, 1, 3, . . . ), any reconstruction level of the second set (red points) can be selected for the second transform coefficient $t'_1$. In the example, the reconstruction levels for the first and second set are shifted by half the quantization step size (any reconstruction level of the second set is located between two reconstruction levels of the first set).

The dependent scalar quantization of transform coefficients has the effect that, for a given average number of reconstruction vectors per N-dimensional unit volume 20, the expectation value of the distance between a given input vector of transform coefficients and the nearest available reconstruction vector is reduced. As a consequence, the average distortion between the input vector of transform coefficients and the vector reconstructed transform coefficients can be reduced for a given average number of bits. In vector quantization, this effect is referred to as space-filling gain. Using dependent scalar quantization for transform blocks, a major part of the potential space-filling gain for high-dimensional vector quantization can be exploited. And, in contrast to vector quantization, the implementation complexity of the reconstruction process (or decoding process) is comparable to that of conventional transform coding with independent scalar quantizers.

Figure 6A:
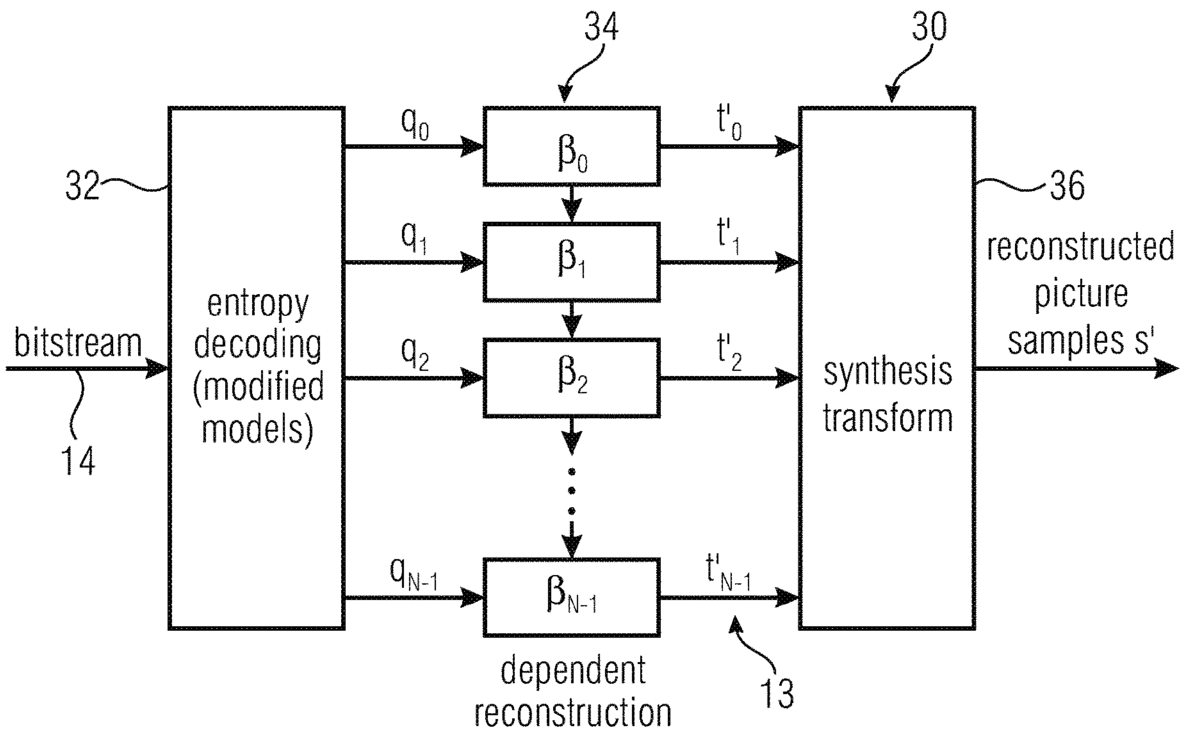
FIG. 6*a* shows a block diagram of a transform decoder using dependent scalar quantization, thereby forming an embodiment of a media decoder according to the present application. Modifications relative to conventional transform coding (with independent scalar quantizers) are derivable by comparison to FIG. 2*b;*

A block diagram of a transform decoder 30 with dependent scalar quantization is illustrated in FIG. 6*a* and comprises an entropy decoder 32, a quantization stage 34 for dependent scalar dequantization, and a synthesis transformer 36. The main change (highlighted in red) is the dependent quantization. As indicated by the vertical arrows, the reconstructed transform coefficient $t'_k$, with reconstruction order index k>0, does not only depend on the associated quantization index $q_k$, but also on the quantization indexes $q_0, q_1, \ldots, q_{k-1}$ for preceding transform coefficients in reconstruction order. Note that in dependent quantization, the reconstruction order of transform coefficients 13 has to be uniquely defined. The performance of the overall transform codec can typically be improved if the knowledge about the set of reconstruction levels associated with a quantization index $q_k$ is also exploited in the entropy coding. That means, it is typically of advantage to switch contexts (probability models) or codeword tables based on the set of reconstruction levels that applies to a transform coefficient.

Figure 6B:
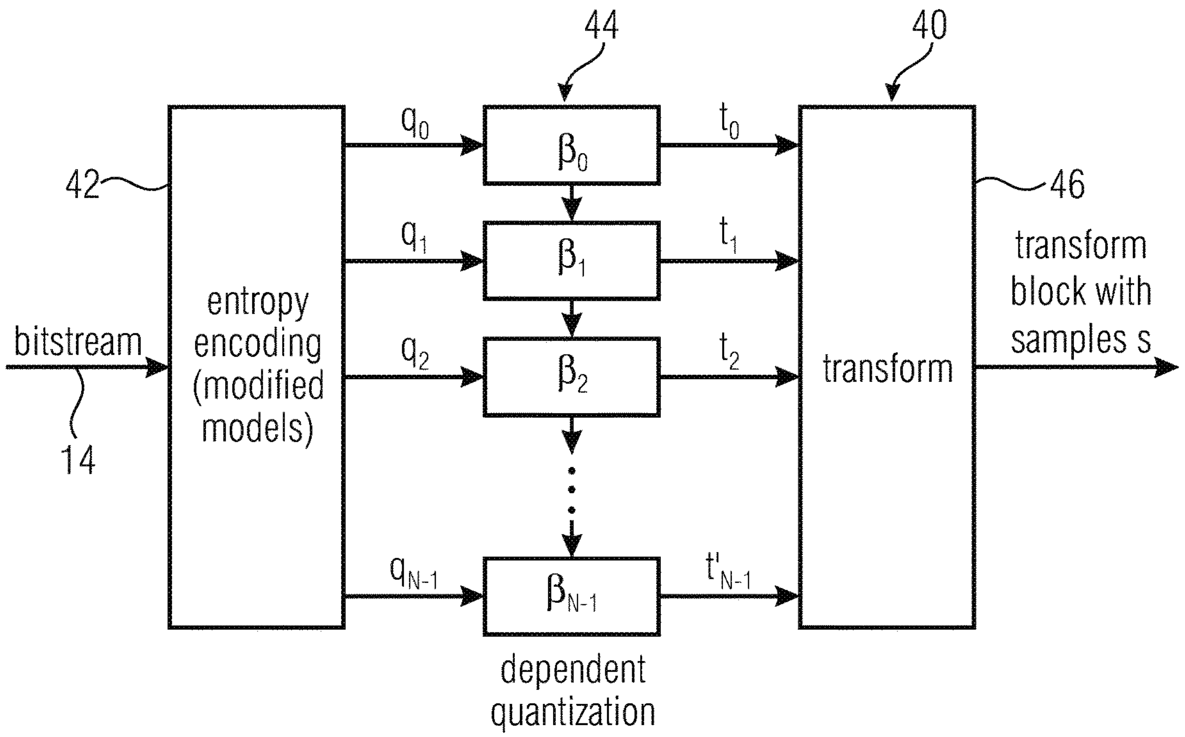
FIG. 6*b* shows a block diagram of a transform encoder using dependent scalar quantization, thereby forming an embodiment of a media encoder according to the present application. Modifications relative to conventional transform coding (with independent scalar quantizers) are derivable by comparison to FIG. 2*a;*

The transform encoder 40 fitting to the decoder of FIG. 6*a* is depicted in FIG. 6*b* and consists of an analysis transform 46, a quantization module 44, and the entropy coder 42. As analysis transform 46 typically the inverse of the synthesis transform (or a close approximation of the inverse) 36 is used, and the entropy coding 42 is usually uniquely specified given the entropy decoding process 32. But, similar as in conventional transform coding, there is a lot of freedom for selecting the quantization indexes given the original transform coefficients.

Embodiments of the present invention are not restricted to block-based transform coding. They are also applicable to transform coding of any finite collection of samples. Any kind of transform that maps a set of samples onto a set of transform coefficients can be used. This includes linear and non-linear transforms. The used transform may also represent an overcomplete (the number of transform coefficients is larger than the number of samples) or undercomplete (the number of transform coefficients is smaller than the number of samples) transform. In an embodiment, the dependent quantization is combined with a linear transform of orthogonal basis functions. Due to integer implementations, the transform can deviate from a linear transform (due to rounding in the transform step). Furthermore, the transform can represent an integer approximation of a transform with orthogonal basis functions (in which case, the basis functions may only be approximately orthogonal). In a special case, the transform can represent the identity transform, in which case the samples or residual samples are directly quantized.

In an embodiment, the dependent quantization concept discussed below is used for transform coding of samples blocks (for example, blocks of original samples or blocks of prediction error samples). In this context, the transform can represent a separable transform, a non-separable transform, a combination of a separable primary transform and a non-separable secondary transform (where the second transform can be either applied to all coefficients obtained after the primary transform or a subset of the coefficients). If a non-separable secondary transform is applied to a subset, the subset can consist of a subblock of the obtained matrix of transform coefficients or it can represent any other subset of the transform coefficients obtained after the primary transform (for example, arbitrarily shaped regions inside the block of transform coefficients). The transform may also represent a multi-level transform with more than two transform levels.

Details and embodiments for the dependent quantization of transform coefficients are described in the following. Furthermore, various ways for the entropy coding of quantization indexes that specify reconstructed transform coefficients for dependent scalar quantization are described. In addition, optional methods for a block-adaptive selection between dependent and independent scalar quantization as well as methods for adapting the quantization step size are presented. Finally, approaches for determining the quantization indexes for dependent quantization in an encoder are discussed.

Dependent quantization of transform coefficients refers to a concept in which the set of available reconstruction levels for a transform coefficient depends on the chosen quantization indexes for preceding transform coefficients in reconstruction order (typically restricted to quantization indexes inside the same transform block).

In an embodiment, multiple sets of reconstruction levels are pre-defined and, based on the quantization indexes for preceding transform coefficients in coding order, one of the predefined sets is selected for reconstructing the current transform coefficient. Some embodiments for defining sets of reconstruction levels are described first. The identification and signaling of a chosen reconstruction level is described thereinafter. Even further embodiments for selecting one of the pre-defined sets of reconstruction levels for a current transform coefficient (based on chosen quantization indexes for preceding transform coefficients in reconstruction order) are described.

Figure 7A:
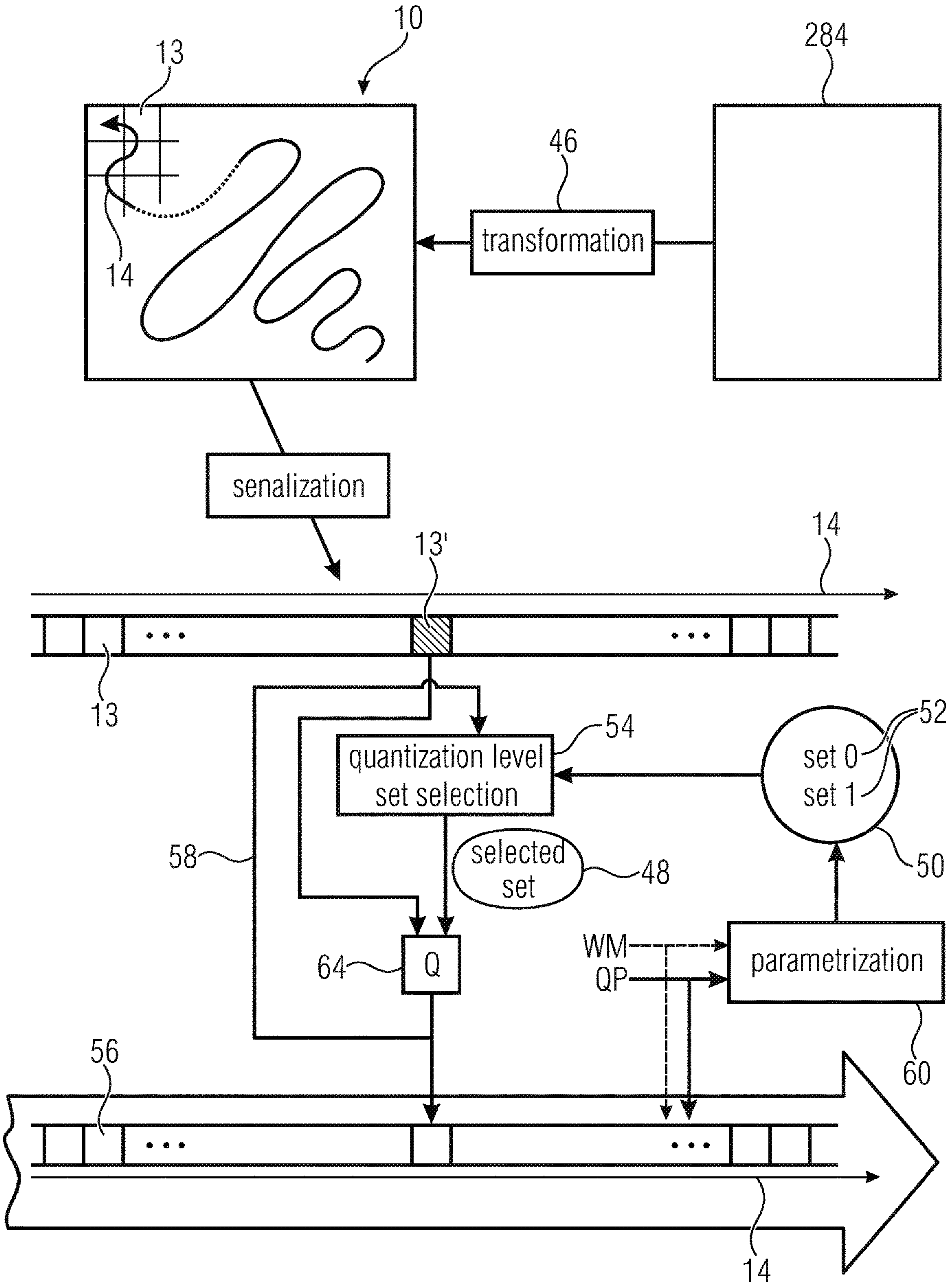
FIG. 7*a* shows a schematic diagram of a concept for quantization performed within an encoder for encoding transform coefficients according to an embodiment such as by quantization stage of FIG. 6*b;*
Figure 7B:
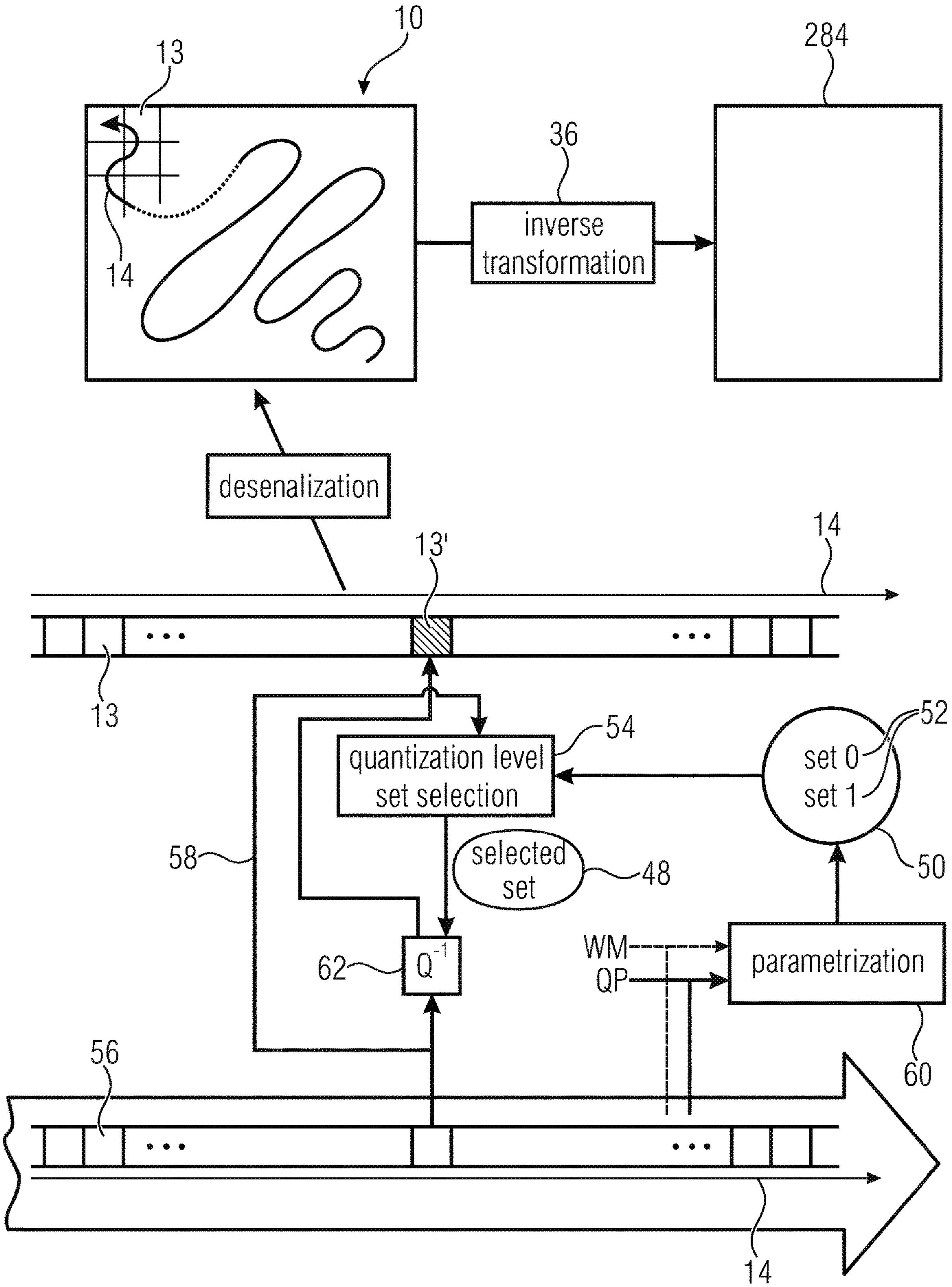
FIG. 7*b* shows a schematic diagram of a concept for dequantization performed within a decoder for decoding transform coefficients according to an embodiment such as by dequantization stage of FIG. 6*a;*

In an embodiment and as is shown in FIGS. 7*a* and 7*b*, the set 48 of admissible reconstruction levels for a current transform coefficient 13' is selected 54 (based on a set 58 of the quantization indexes 56 for preceding transform coefficients in coding order 14) among a collection 50 (two or more sets) of pre-defined sets 52 of reconstruction levels. The collection 50 may be used for all coefficients 13, wherein, however, reference is made to the subsequent description of the possible parameterizable characteristic of the sets 52. In a particular embodiment and as shown in subsequent examples, the values of the reconstruction levels of the sets of reconstruction levels are parameterized 60 by a block-based quantization parameter. That means, the video codec supports a modification of a quantization parameter (QP) on the basis of blocks (which can correspond to a single transform block 10 or multiple transform blocks) and the values of the reconstruction levels inside the used sets of reconstruction levels are determined by the selected quantization parameter. For example, if the quantization parameter is increased, the distance between neighboring reconstruction levels is also increased, and if the quantization parameter is decreased, the distance between neighboring reconstruction levels is also decreased (or vice versa).

In an exemplary version, the block-based quantization parameter (QP) determines a quantization step size Δ (or corresponding scale and shift parameters as described above) and all reconstruction levels (in all sets of reconstruction levels) represent integer multiples of the quantization step size Δ. But note that each set of reconstruction levels includes only a subset of the integer multiples of the quantization step size Δ. Such a configuration for dependent quantization, in which all possible reconstruction levels for all sets of reconstruction levels represent integer multiples of the quantization step size, can be considered of an extension of uniform reconstruction quantizers (URQs). Its basic advantage is that the reconstructed transform coefficients can be calculated by algorithms with a very low computational complexity (as will be described below in more detail).

The sets 52 of the reconstruction levels can be completely disjoint; but it is also possible that one or more reconstruction levels are contained in multiple sets (while the sets still differ in other reconstruction levels). The quantization step size $\Delta_k$ for a particular transform coefficient $t_k$ (with k indicating the reconstruction order) may not be solely determined by the block quantization parameter QP, but it is also possible that the quantization step size $\Delta_k$ for a particular transform coefficient $t_k$ is determined by a quantization weighting matrix (WM) and the block quantization parameter. Typically, the quantization step size $\Delta_k$ for a transform coefficient $t_k$ is given by the product of the weighting factor $w_k$ for the transform coefficient $t_k$ (specified by the quantization weighting matrix) and the block quantization step size $\Delta_{block}$ (specified by the block quantization parameter), $$\Delta_k=w_k\cdot\Delta_{block}$$

It should be noted that the actual calculation, i.e., the dequantization 62, of reconstructed transform coefficients $t'_k$ (or the actual calculation of reconstruction levels) wherein k may index the current position may slightly deviate from an ideal multiplication due to integer implementations or other implementation aspects. Let $\Delta_k$ be the quantization step size for a particular transform coefficient $t_k$ and let $n_k$ specify a nominal integer factor of the quantization step size (e.g., given by the quantization index $q_k$). With ideal multiplication, the reconstructed transform coefficient $t'_k$ is given by $$t'_k=n_k\cdot\Delta_k.$$

Due to a restriction to integer implementations, the reconstructed transform coefficient $t'_k$ (or a corresponding reconstruction level) may be actually determined according to EQUATION or a similar procedure. If we speak of integer multiples of a quantization step size in the following description, the corresponding text also applies to integer approximations similar to the one specified above. The quantization 64 involves a corresponding division.

In an embodiment, the dependent scalar quantization for transform coefficients uses exactly two different sets 52 of reconstruction levels. And in an embodiment, all reconstruction levels of the two sets for a transform coefficient $t_k$ represent integer multiples of the quantization step size $\Delta_k$ for this transform coefficient (which is, at least partly, determined by a block-based quantization parameter). Note that the quantization step size $\Delta_k$ just represents a scaling factor for the admissible reconstruction values in both sets. Except of a possible individual quantization step size $\Delta_k$ for the different transform coefficients $t_k$ inside a transform block (and, thus, an individual scaling factor), the same two sets of reconstruction levels are used for all transform coefficients.

In FIG. 8, three configurations for the two sets of reconstruction levels are illustrated. Note that all reconstruction levels lie on a grid given by the integer multiples of the quantization step size $\Delta$. It should further be noted that certain reconstruction levels can be contained in both sets.

Figure 8A:
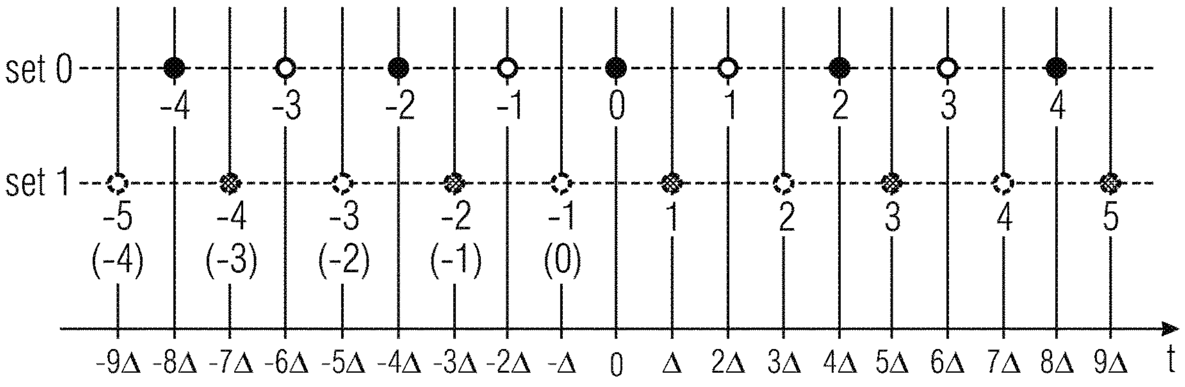
FIG. 8*a,b,c* show schematic diagrams of collections of available quantization sets between which switching is done according to previous levels; in particular, examples for dependent quantization with two sets of reconstruction levels that are completely determined by a single quantization steps size Δ is shown. The two available sets of reconstruction levels are highlighted with different colors (blue for set 0 and red for set 1). Examples for quantization indexes that indicate a reconstruction level inside a set are given by the numbers below the circles. The hollow and filled circles indicate two different subsets inside the sets of reconstruction levels; the subsets can be used for determining the set of reconstruction levels for the next transform coefficient in reconstruction order. The figures show three configurations with two sets of reconstruction levels: (a) The two sets are disjoint and symmetric with respect to zero; (b) Both sets include the reconstruction level equal to zero, but are otherwise disjoint; the sets are non-symmetric around zero; (c) Both sets include the reconstruction level equal to zero, but are otherwise disjoint; both sets are symmetric around zero.

The two sets depicted in FIG. 8*a* are disjoint. Each integer multiple of the quantization step size $\Delta$ is only contained in one of the sets. While the first set (set 0) contains all even integer multiples of the quantization step size, the second set (set 1) contain all odd integer multiples of the quantization step size. In both sets, the distance between any two neighboring reconstruction levels is two times the quantization step size. These two sets are usually suitable for high-rate quantization, i.e., for settings in which the standard deviation of the transform coefficients is significantly larger than the quantization step size. In video coding, however, the quantizers are typically operated in a low-rate range. Typically, the absolute value of many original transform coefficients is closer to zero than to any non-zero multiple of the quantization step size. In that case, it is typically of advantage if the zero is included in both quantization sets (sets of reconstruction levels).

Figure 8B:
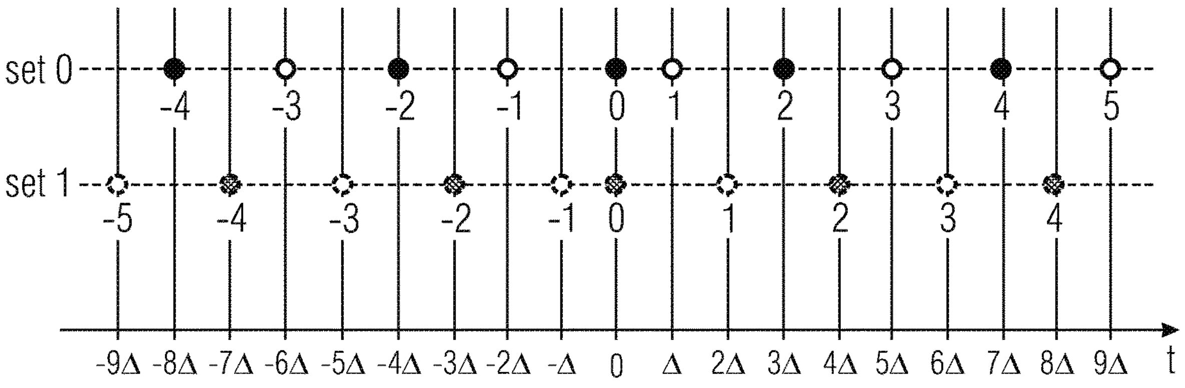

The two quantization sets illustrated in FIG. 8*b* both contain the zero. In set 0, the distance between the reconstruction level equal to zero and the first reconstruction level greater than zero is equal to the quantization step size, while all other distances between two neighboring reconstruction levels are equal to two times the quantization step size. Similarly, in set 1, the distance between the reconstruction level equal to zero and the first reconstruction level smaller than zero is equal to the quantization step size, while all other distances between two neighboring reconstruction levels are equal to two times the quantization step size. Note that both reconstruction sets are non-symmetric around zero. This may lead to inefficiencies, since it makes it difficult to accurately estimate the probability of the sign.

Figure 8C:
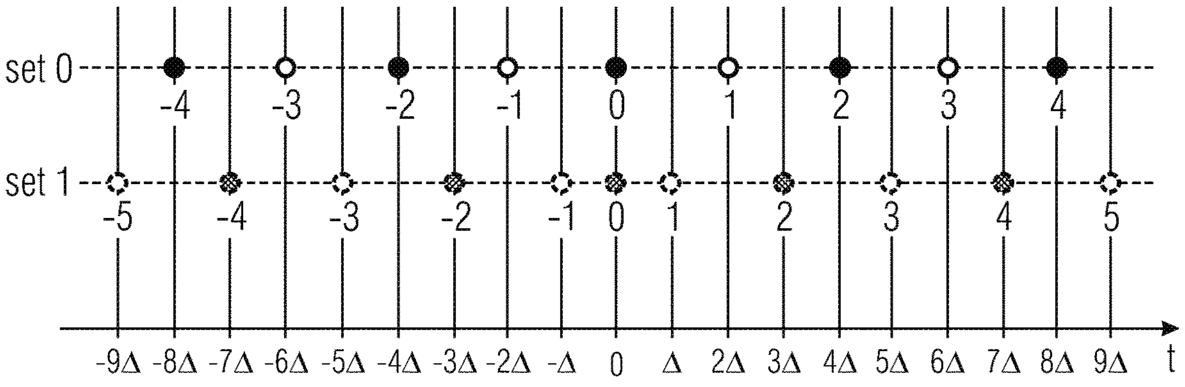

Another configuration for the two sets of reconstruction levels is shown in FIG. 8*c*. The reconstruction levels that are contained in the first quantization set (labeled as set 0 in the figure) represent the even integer multiples of the quantization step size (note that this set is actually the same as the set 0 in FIG. 8*a*). The second quantization set (labeled as set 1 in the figure) contains all odd integer multiples of the quantization step size and additionally the reconstruction level equal to zero. Note that both reconstruction sets are symmetric about zero. The reconstruction level equal to zero is contained in both reconstruction sets, otherwise the reconstruction sets are disjoint. The union of both reconstruction sets contains all integer multiples of the quantization step size.

One is not restricted to the configurations shown in FIG. 8. Any other two different sets of reconstruction levels can be used. Multiple reconstruction levels may be included in both sets. Or the union of both quantization sets may not contain all possible integer multiples of the quantization step size. Furthermore, it is possible to use more than two sets of reconstruction levels for the dependent scalar quantization of transform coefficients.

As to the signaling of chosen reconstruction levels, the following is noted. The reconstruction level that the encoder selects in step 64 among the admissible reconstruction levels is indicated inside the bitstream 14. As in conventional independent scalar quantization, this can be achieved using so-called quantization indexes 56, which are also referred to as transform coefficient levels. Quantization indexes (or transform coefficient levels) are integer numbers that uniquely identify the available reconstruction levels inside a quantization set 48 (i.e., inside a set of reconstruction levels). The quantization indexes are sent to the decoder as part of the bitstream 14 (using, e.g., any entropy coding technique). At the decoder side, the reconstructed transform coefficients can be uniquely calculated based on a current set 48 of reconstruction levels (which is determined 54 by the preceding quantization indexes 58 in coding/reconstruction order) and the transmitted quantization index 56 for the current transform coefficient.

In an embodiment, the assignment of quantization indexes to reconstruction levels inside a set 48 of reconstruction levels (or quantization set) follows the following rules. For illustration, the reconstruction levels in FIG. 8 are labeled with an associated quantization index (the quantization indexes are given by the numbers below the circles that represent the reconstruction levels). If a set of reconstruction levels includes the reconstruction level equal to 0, the quantization index equal to 0 is assigned to the reconstruction level equal to 0. The quantization index equal to 1 is assigned to the smallest reconstruction level greater than 0, the quantization index equal to 2 is assigned to the next reconstruction level greater than 0 (i.e., the second smallest reconstruction level greater than 0), etc. Or, in other words, the reconstruction levels greater than 0 are labeled with integer numbers greater than 0 (i.e., with 1, 2, 3, etc.) in increasing order of their values. Similarly, the quantization index −1 is assigned to the largest reconstruction level smaller than 0, the quantization index −2 is assigned to the next (i.e., the second largest) reconstruction level smaller than 0, etc. Or, in other words, the reconstruction levels smaller than 0 are labeled with integer numbers less than 0 (i.e., −1, −2, −3, etc.) in decreasing order of their values. For the examples in FIG. 8, the described assignment of quantization indexes is illustrated for all quantization sets, except set 1 in FIG. 8*a* (which does not include a reconstruction level equal to 0).

For quantization sets that don't include the reconstruction level equal to 0, one way of assigning quantization indexes to reconstruction levels is the following. All reconstruction levels greater than 0 are labeled with quantization indexes greater than 0 (in increasing order of their values) and all reconstruction levels smaller than 0 are labeled with quantization indexes smaller than 0 (in decreasing order of the values). Hence, the assignment of quantization indexes basically follows the same concept as for quantization sets that include the reconstruction level equal to 0, with the difference that there is no quantization index equal to 0 (see labels for quantization set 1 in FIG. 8*a*). That aspect should be considered in the entropy coding of quantization indexes. For example, the quantization index is often transmitted by coding its absolute value (ranging from 0 to the maximum supported value) and, for absolute values unequal to 0, additionally coding the sign of the quantization index. If no quantization index equal to 0 is available, the entropy coding could be modified in a way that the absolute level minus 1 is transmitted (the values for the corresponding syntax element range from 0 to a maximum supported value) and the sign is transmitted. As an alternative, the assignment rule for assigning quantization indexes to reconstruction levels could be modified. For example, one of the reconstruction levels close to zero could be labeled with the quantization index equal to 0. And then, the remaining reconstruction levels are labeled by the following rule: Quantization indexes greater than 0 are assigned to the reconstruction levels that are greater than the reconstruction level with quantization index equal to 0 (the quantization indexes increase with the value of the reconstruction level). And quantization indexes less than 0 are assigned to the reconstruction levels that are smaller than the reconstruction level with the quantization index equal to 0 (the quantization indexes decrease with the value of the reconstruction level). One possibility for such an assignment is illustrated by the numbers in parentheses in FIG. 8*a* (if no number in parentheses is given, the other number applies).

As mentioned above, in an embodiment, two different sets 52 of reconstruction levels (which we also call quantization sets) are used, and the reconstruction levels inside both sets 52 represent integer multiples of the quantization step size Δ. That includes cases, in which different quantization step sizes are used for different transform coefficients inside a transform block (e.g., by specifying a quantization weighting matrix). And it includes cases, in which the quantization step size is modified on a block basis (e.g., by transmitting a block quantization parameter inside the bitstream).

The usage of reconstruction levels that represent integer multiples of a quantization step sizes allows computationally low complex algorithms for the reconstruction of transform coefficients at the decoder side. This is illustrated based on the example of FIG. 8*c* in the following (similar simple algorithms also exist for other configurations, in particular, the settings shown in FIG. 8*a* and FIG. 8*b*). In the configuration shown in FIG. 8*c*, the first quantization set, set 0, includes all even integer multiples of the quantization step size and the second quantization set, set 1, includes all odd integer multiples of the quantization step size plus the reconstruction level equal to 0 (which is contained in both quantization sets). The reconstruction process 62 for a transform coefficient 13' could be implemented similar to the algorithm specified in the pseudo-code of FIG. 9.

In the pseudo-code of FIG. 9*a*, level[k] denotes the quantization index 56 that is transmitted in the data stream 14 for a transform coefficient $t_k$ 13' and setId[k] (being equal to 0 or 1) specifies the identifier of the current set 48 of reconstruction levels (it is determined 54 based on preceding quantization indexes 58 in reconstruction order 14 as will be described in more detail below). The variable n represents the integer multiple of the quantization step size given by the quantization index level[k] and the set identifier setId[k]. If the transform coefficient 13' is coded using the first set of reconstruction levels (setId[k]==0), which contains the even integer multiples of the quantization step size ‘k, the variable n is two times the transmitted quantization index. If the transform coefficient 13’ is coded using the second set of reconstruction levels (setId[k]==1), we have the following three cases: (a) if level[k] is equal to 0, n is also equal to 0; (b) if level[k] is greater than 0, n is equal to two times the quantization index level[k] minus 1; and (c) if level[k] is less than 0, n is equal to two times the quantization index level[k] plus 1. This can be specified using the sign function $$\text{sign}(x) = \begin{cases} 1 & : x > 0 \\ 0 & : x = 0 \\ -1 & : x < 0 \end{cases}.$$

Then, if the second quantization set is used, the variable n is equal to two times the quantization index level[k] minus the sign function sign(level[k]) of the quantization index. Once the variable n (specifying the integer factor of the quantization step size) is determined, the reconstructed transform coefficient $t'_k$, i.e. the current coefficient 13', is obtained by multiplying n with the quantization step size $\Delta_k$.

As mentioned above, instead of an exact multiplication with the quantization step size $L_k$, the reconstructed transform coefficient $t'_k$, can be obtained by an integer approximation. This is illustrated in the pseudo-code in FIG. 9*b*. Here, the variable “shift” represents a bit shift to the right. Its value typically depends only on the quantization parameter for the block (but it is also possible that the shift parameter can be changed for different transform coefficients inside a block). The variable scale[k] represents a scaling factor for the transform coefficient $t_k$; in addition to the block quantization parameter, it can, for example, depend on the corresponding entry of the quantization weighting matrix. The variable “add” specifies a rounding offset, it is typically set equal to add=(1<<(shift−1)). It should be noted that the integer arithmetic specified in the pseudo-code of FIG. 9*b* (last line) is, with exception of the rounding, equivalent to a multiplication with a quantization step size $\Delta_k$, given by $$\Delta_k = \text{scale}[k] 2^{-shift},$$

Figures 9A, 9B, 10A:
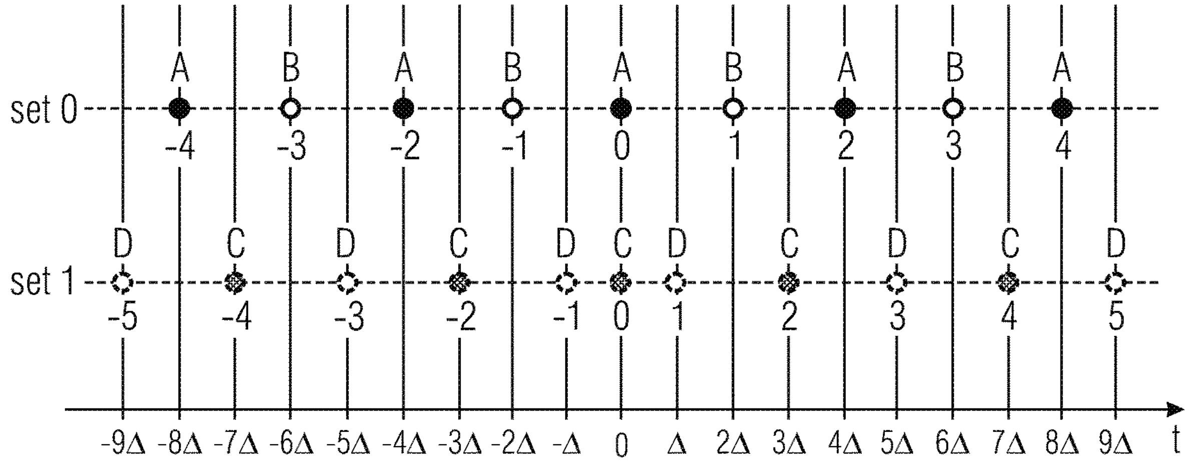
FIG. 9*a* shows a pseudo-code illustrating an example for the reconstruction process for transform coefficients. k represents an index that specifies the reconstruction order of the current transform coefficient, the quantization index for the current transform coefficient is denoted by level[k], the quantization step size $\Delta_k$ that applies to the current transform coefficient is denoted by quant_step_size[k], and trec[k] represents the value of the reconstructed transform coefficient t'k. The variable setId[k] specifies the set of reconstruction levels that applies to the current transform coefficient. It is determined based on the preceding transform coefficients in reconstruction order; the possible values of setId[k] are 0 and 1. The variable n specifies the integer factor of the quantization step size; it is given by the chosen set of reconstruction levels (i.e., the value of setId[k]) and the transmitted quantization index level[k]
FIG. 9*b* shows a pseudo-code illustrating an alternative implementation of the pseudo-code in FIG. 9*a*. The main change is that the multiplication with the quantization step is represented using an integer implementation using a scale and a shift parameter. Typically, the shift parameter (represented by shift) is constant for a transform block and only the scale parameter (given by scale[k]) may depend on the location of the transform coefficient. The variable add represents a rounding offset, it is typically set equal to add=(1<<(shift−1)). With $\Delta_k$ being the nominal quantization step for the transform coefficient, the parameters shift and scale [k] are chosen in a way that we have $\Delta_k \approx \text{scale}[k] \cdot 2^{-shift}$.
FIG. 10*a* shows a schematic diagram of an example for a splitting of the sets of reconstruction levels into two subsets. The two shown quantization sets are the quantization sets of the example of FIG. 8*c*. The two subsets of the quantization set 0 are labeled using "A" and "B", and the two subsets of quantization set 1 are labeled using "C" and "D"

Another change in FIG. 9*b* relative to FIG. 9*a* is that the switch between the two sets of reconstruction levels is implemented using the ternary if-then-else operator (a?b:c), which is known from programming languages such as the C programming language, which change could be reversed, however, or applied to FIG. 9*a*, too.

Besides the selection of the sets 52 of reconstruction levels discussed above, another important design aspect of dependent scalar quantization is the algorithm 54 used for switching between the defined quantization sets (sets of reconstruction levels). The algorithm 54 used determines the “packing density” that can be achieved in the N-dimensional space 20 of transform coefficients (and, thus, also in the N-dimensional space 20 of reconstructed samples). A higher packing density eventually results in an increased coding efficiency. The selection process 54 may use a fixed selection rule for each transform coefficient, where the chosen set of reconstruction levels depends on a certain number of directly preceding reconstruction levels in coding order as described below (where this number is exemplarily two). This rule may be implemented using state transition tables or a trellis structure as further outlined below.

A particular exemplary way of determining 54 the set 48 of reconstruction levels for the next transform coefficients is based on a partitioning of the quantization sets 52, as it is illustrated in FIG. 10*a* for a particular example. Note that the quantization sets shown in FIG. 10*a* are the same quantization sets as the ones in FIG. 8*c*. Each of the two (or more) quantization sets 52 is partitioned into two subsets. For the example in FIG. 10*a*, the first quantization set (labeled as set 0) is partitioned into two subsets (which are labeled as A and B) and the second quantization set (labeled as set 1) is also partitioned into two subsets (which are labeled as C and D). Even though it is not the only possibility (an alternative is described below), the partitioning for each quantization set is exemplarily done in a way that directly neighboring reconstruction levels (and, thus, neighboring quantization indexes) are associated with different subsets. In an embodiment, each quantization set is partitioned into two subsets. In FIG. 8 and FIG. 10*a*, the partitioning of the quantization sets into subsets is indicated by hollow and filled circles.

For the embodiment illustrated in FIG. 10*a* and FIG. 8*c*, the following partitioning rules apply:

- Subset A consists of all even quantization indexes of the quantization set 0;
- Subset B consists of all odd quantization indexes of the quantization set 0;
- Subset C consists of all even quantization indexes of the quantization set 1;
- Subset D consists of all odd quantization indexes of the quantization set 1.

It should be noted that the used subset is typically not explicitly indicated inside the bitstream. Instead, it can be derived based on the used quantization set (e.g., set 0 or set 1) and the actually transmitted quantization index. For the partitioning shown in FIG. 10*a*, the subset can be derived by a bit-wise "and" operation of the transmitted quantization index level and 1. Subset A consists of all quantization indexes of set 0 for which (level&1) is equal to 0, subset B consists of all quantization indexes of set 0 for which (level&1) is equal to 1, subset C consists of all quantization indexes of set 1 for which (level&1) is equal to 0, and subset D consists of all quantization indexes of set 1 for which (level&1) is equal to 1.

In an embodiment, the quantization set (set of admissible reconstruction levels) that is used for reconstructing a current transform coefficient is determined based on the subsets that are associated with the last two or more quantization indexes. An example, in which the two last subsets (which are given by the last two quantization indexes) are used is shown in the table of FIG. 10*b*. The table has to be read as follows: The first subset given in the first table column represents the subset for the directly preceding coefficient and the second subset given in the first table column represents the subset for the coefficient that precedes the directly preceding coefficient. The determination 54 of the quantization set 48 specified by this table represents a specific embodiment. In other embodiments, the quantization set 48 for a current transform coefficient 13' is determined by the subsets that are associated with the last three or more quantization indexes 58. For the first transform coefficient of a transform block, we don't have any data about the subsets of preceding transform coefficients (since there are no preceding transform coefficients). In an embodiment, pre-defined values are used in these cases. In a further embodiment, we infer the subset A for all non-available transform coefficients. That means, if we reconstruct the first transform coefficient, the two preceding subsets are inferred as "AA" and, thus, according table of FIG. 10*b*, the quantization set 0 is used. For the second transform coefficient, the subset of the directly preceding quantization index is determined by its value (since set 0 is used for the first transform coefficient, the subset is either A or B), but the subset for the second last quantization index (which does not exist) is inferred to be equal to A. Of course, any other rules can be used for inferring default values for non-existing quantization indexes. It is also possible to use other syntax elements for deriving default subsets for the non-existing quantization indexes. As a further alternative, it is also possible to use the last quantization indexes of the preceding transform block for initialization. For example, the concept of dependent quantization for transform coefficients could be used in way that the dependencies apply across transform block boundaries (but may be limited to boundaries of greater blocks such as CTUs or slices, pictures, etc.).

It should be noted that the subset (A, B, C, or D) of a quantization index is determined by the used quantization set (set 0 or set 1) and the used subset inside the quantization set (for example, A or B for set 0, and C or D for set 1). The chosen subset inside a quantization set is also referred to as path (since it specifies a path if we represent the dependent quantization process as trellis structure as will be described below). In our convention, the path is either equal to 0 or 1. Then subset A corresponds to path 0 in set 0, subset B corresponds to path 1 in set 0, subset C corresponds to path 0 in set 1, and subset D corresponds to path 1 in set 1. Hence, the quantization set 48 for the next transform coefficient following coefficient 13' is also uniquely determined by the quantization sets (set 0 or set 1) and the paths (path 0 or path 1) that are associated with the two (or more) last quantization indexes 58 of current coefficient 13' and the one before, or alternatively speaking, set 48 for coefficient 13' is determined depending on indices 58 for the two coefficients preceding 13'. In the table of FIG. 10*b*, the associated quantization sets and paths are specified in the second column. As for the first column, the first entry represents the set and path for the directly preceding coefficient and the second entry represents the set and path for the coefficient that precedes the directly preceding coefficient.

It should be noted that the path can often by determined by simple arithmetic operations. For example, for the configuration shown in FIG. 10*a*, the path is given by $$\text{Path}=(\text{level}[k]\&1),$$

where level[k] represent the quantization index (transform coefficient level) and the operator & specifies a bit-wise "and" (in two-complement integer arithmetic).

The variable path can be defined as any binary function, path=bin Function(level[k]), of the previous quantization index (transform coefficient level) level[k]. For example, as an alternative function, we could use path=(level [k]≠0?1:0), meaning that the variable path is equal to zero if the last transform coefficient level is equal to 0 and the variable path is equal to one if the last transform coefficient level is not equal to 0. With this definition, the subset A represents the quantization index equal to 0 in the first quantization set, the subset B represents all non-zero quantization indexes in the first quantization set, the subset C represents the quantization index equal to 0 in the second quantization set, and the subset D represents all non-zero quantization indexes in the second quantization set. But as mentioned above, any other partitioning of the two quantization sets into subsets, and, thus any other binary function for the path, is possible.

The transition between the quantization sets (set 0 and set 1) can also be elegantly represented by a state variable. An example for such a state variable is shown in the last column of the table of FIG. 10*b*. For this example, the state variable has four possible values (0, 1, 2, 3). On the one hand, the state variable specifies the quantization set that is used for the current transform coefficient. In the example of the table of FIG. 10*b*, the quantization set 0 is used if and only if the state variable is equal to 0 or 1, and the quantization set 1 is used if and only if the state variable is equal to 2 or 3. On the other hand, the state variable also specifies the possible transitions between the quantization sets. By using a state variable, the rules of table of FIG. 10*b* can be described by a smaller state transition table. As an example, the table of FIG. 10*c* specifies a state transition table for the rules given in the table of FIG. 10*b*. Given a current state, it specified the quantization set for the current transform coefficient (second column). It further specifies the state transition based on the path that is associated with the chosen quantization index (the path specifies the used subset A, B, C, or D if the quantization set is given). Note that by using the concept of state variables, it is not required to keep track of the actually chosen subset. In reconstructing the transform coefficients for a block, it is sufficient to update a state variable and determine the path of the used quantization index.

In an embodiment, the path is given by the parity of the quantization index. With level[k] being the current quantization index, it can be determined according to $$\text{Path}=(\text{level}[k]\&1),$$

where the operator & represents a bit-wise "and" in two-complement integer arithmetic. But, as noted above, any other binary function of the last transform coefficient level[k] can be used for defining the path.

In an embodiment, a state variable with four possible values is used. In other embodiments, a state variable with a different number of possible values is used. Of particular interest are state variables for which the number of possible values for the state variable represents an integer power of two, i.e., 4, 8, 16, 32, 64, etc. It should be noted that, in a certain configuration (as given in the table of FIGS. 10*b* and 10*c*), a state variable with 4 possible values is equivalent to an approach where the current quantization set is determined by the subsets of the last two quantization indexes. A state variable with a possible values would correspond to a similar approach where the current quantization set is determined by the subsets of the three last quantization indexes. A state variable with 16 possible values would correspond to an approach, in which the current quantization set is determined by the subsets of the last four quantization indexes, etc. Even though it is generally of advantage to use state variables with a number of possible values that is equal to an integer power of two, there is no limitation to this setting.

Using the concept of state transition, the current state and, thus, the current quantization set 54 is uniquely determined by the previous state (in reconstruction order) and the previous quantization index. However, for the first transform coefficient in a transform block, there are no previous state and previous quantization index. Hence, the state for the first transform coefficient of a block is uniquely defined. There are different possibilities. Note the substitutional setting of the state is 0 to 3, here in this example, two preceding coefficients preceding the first coefficient are actually not present. Possible choices are:

The first state for a transform block 10 is set equal to a fixed pre-defined value. In an embodiment, the first state is set equal to 0.

The value of the first state is explicitly transmitted as part of the bitstream. This includes approaches, where only a subset of the possible state values can be indicated by a corresponding syntax element.

The value of the first state is derived based on other syntax elements for the transform block 10. That means even though the corresponding syntax elements (or syntax element) are used for signaling other aspects to the decoder, they are additionally used for deriving the first state for dependent scalar quantization.

As an example, the following approach could be used: In entropy coding of quantization (cp. above) the location of the first non-zero quantization index in coding order 140 may be transmitted (using the x and y coordinates, for instance) before the actual values of the quantization indexes are transmitted (all quantization indexes that precede this first non-zero quantization index in coding order 14 are not transmitted, but inferred to be equal to 0). The location of the first non-zero quantization index can also be used for deriving the initial value of the state variable. As a simple example, let M represent the number of quantization indexes that are not inferred to be equal to 0 by the location of the first non-zero quantization index in coding order, then the initial state could be set equal to s=M % 4, where the operator % specifies the modulo operator.

The state transition concept can also be applied across transform block boundaries. That means the first state for a transform block is set equal to the last state (after a final state update) of the previous transform block in coding order. That means, for the first quantization index, the previous state is set equal to the last state of the last transform block and the previous quantization index is set equal to the last quantization index of the last transform block). In other words, the transform coefficients of multiple transform blocks (or the subsets of the transform coefficients that are not inferred to be equal to 0 by transmitted locations of the first non-zero quantization indexes in coding order proceeding block 10) are treated as a unity for dependent scalar quantization. Multiple transform blocks may be treated as a unity only if certain conditions are fulfilled. For example, the multiple transform blocks may be treated as a unity only if they represent the blocks that are obtained by a final block splitting operation (i.e., they represent the blocks that are obtained by the last split level), and/or they represent inter-picture coded block.

The concept of state transition for the dependent scalar quantization allows low-complexity implementations for the reconstruction of transform coefficients in a decoder. An example for the reconstruction process of transform coefficients of a single transform block is shown in FIG. 11 using C-style pseudo-code.

In the pseudo-code of FIG. 11, the index k specifies the reconstruction order 14 of transform coefficients 13. It should be noted that, in the example code, the index k decreases in reconstruction order 14. The last transform coefficient in reconstruction order has the index equal to k=0. The first index kstart specifies the reconstruction index (or, more accurately, the inverse reconstruction index) of the first reconstructed transform coefficient. The variable kstart may be set equal to the number of transform coefficients in the transform block minus 1, or it may be set equal to the index of the first non-zero quantization index (for example, if the location of the first non-zero quantization index is transmitted in the applied entropy coding method) in coding/reconstruction order. In the latter case, all preceding transform coefficients (with indexes k>kstart) are inferred to be equal to 0. The reconstruction process for each single transform coefficient is the same as in the example of FIG. 9*b*. As for the example in FIG. 9*b*, the quantization indexes are represented by level[k] and the associated reconstructed transform coefficients are represented by trec[k]. The state variable is represented by "state". Note that in the example of FIG. 11, the state is set equal to 0 at the beginning of a transform block. But as discussed above, other initializations (for example, based on the values of some syntax elements) are possible. The 1d table setId[ ] specifies the quantization sets that are associated with the different values of the state variable and the 2d table state_trans_table[ ][ ] specifies the state transitions given the current state (first argument) and the path (second argument). In the example, the path is given by the parity of the quantization index (using the bit-wise and operator &), but, as mentioned above, other concepts (in particular, other binary functions of level[k]) are possible. Examples, in C-style syntax, for the tables setId[ ] and state_trans_table[ ]H are given in FIG. 12 (these tables are identical to the table of FIG. 10*c*).

Instead of using a table state_trans_table[ ][ ] for determining the next state, an arithmetic operation yielding the same result can be used. Similarly, the table setId[ ] could also be implemented using an arithmetic operation (for the given example, the table values can be expressed by a bit shift of one to the right, i.e., by "state>>1"). Or the combination of the table look-up using the 1d table setId[ ] and the sign function could be implemented using an arithmetic operation.

In another embodiment, all quantization indexes equal to 0 are excluded from the state transition and dependent reconstruction process. The information whether a quantization index is equal or not equal to 0 is merely used (possibly in connection with the location of the first non-zero quantization index) for partitioning the transform coefficients into zero and non-zero transform coefficients. The reconstruction process for dependent scalar quantization is only applied to the ordered set of non-zero quantization indexes. All transform coefficients associated with quantization indexes equal to 0 are simply set equal to 0. A corresponding pseudo-code is shown in FIG. 13.

In another embodiment, the block of transform coefficients is decomposed into subblocks 12 (see FIGS. 4*a*, 4*b*) and the syntax includes flags that signal whether a subblock contains any non-zero transform coefficient levels. Then, in one embodiment, the quantization coefficients of the subblocks that only include quantization indexes equal to 0 (as signaled by the corresponding flag) are included in the dependent reconstruction and state transition process. In another embodiment, the quantization indexes of these subblocks are excluded from the dependent reconstruction/dependent quantization and state transition process of FIGS. 7*a* and 7*b*.

Figure 14:
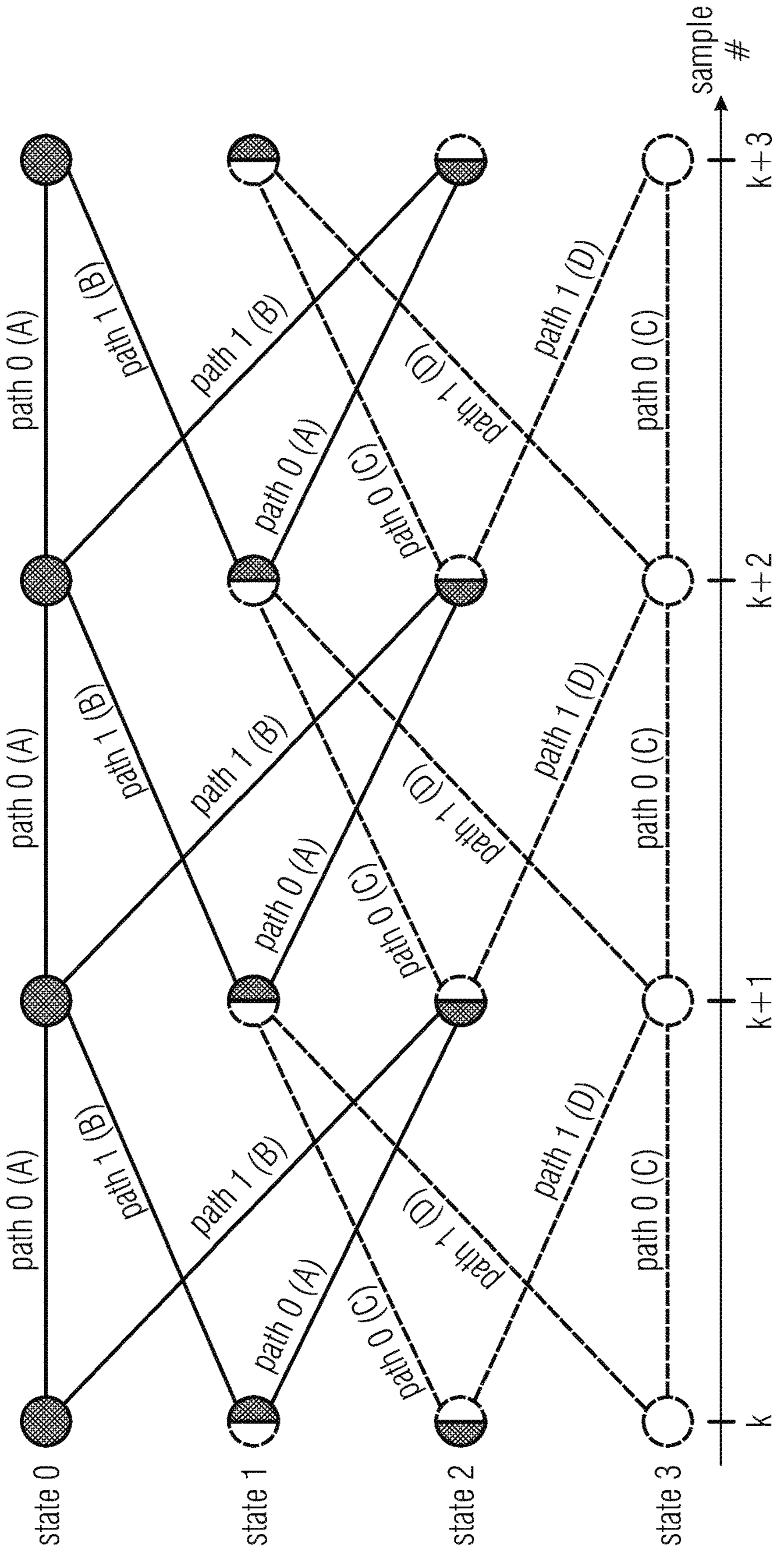
FIG. 14 shows a schematic diagram illustrating a state transition in dependent scalar quantization as trellis structure. The horizontal exists represents different transform coefficients in reconstruction order. The vertical axis represents the different possible states in the dependent quantization and reconstruction process. The shown connections specify the available paths between the states for different transform coefficients.

The state transition in dependent quantization performed in 54 can also be represented using a trellis structure, as is illustrated in FIG. 14. The trellis shown FIG. 14 corresponds to the state transitions specified in the table of FIG. 10*c*. For each state, there are two paths that connect the state for a current transform coefficient with two possible states for the next transform coefficient in reconstruction order. The paths are labeled with path 0 and path 1, this number corresponds to the path variable that was introduced above (for an embodiment, that path variable is equal to the parity of the quantization index). Note that each path uniquely specifies a subset (A, B, C, or D) for the quantization indexes. In FIG. 14, the subsets are specified in parentheses. Given an initial state (for example state 0), the path through the trellis is uniquely specified by the transmitted quantization indexes.

For the example in FIG. 14, the states (0, 1, 2, and 3), for a scan index k, have the following properties (cp. also FIG. 15):

State 0: The previous quantization index level[k−1] specifies a reconstruction level of set 0 and the current quantization index level[k] specifies a reconstruction level of set 0.

State 1: The previous quantization index level[k−1] specifies a reconstruction level of set 1 and the current quantization index level[k] specifies a reconstruction level of set 0.

State 2: The previous quantization index level[k−1] specifies a reconstruction level of set 0 and the current quantization index level[k] specifies a reconstruction level of set 1.

State 3: The previous quantization index level[k−1] specifies a reconstruction level of set 1 and the current quantization index level[k] specifies a reconstruction level of set 1.

Figure 15:
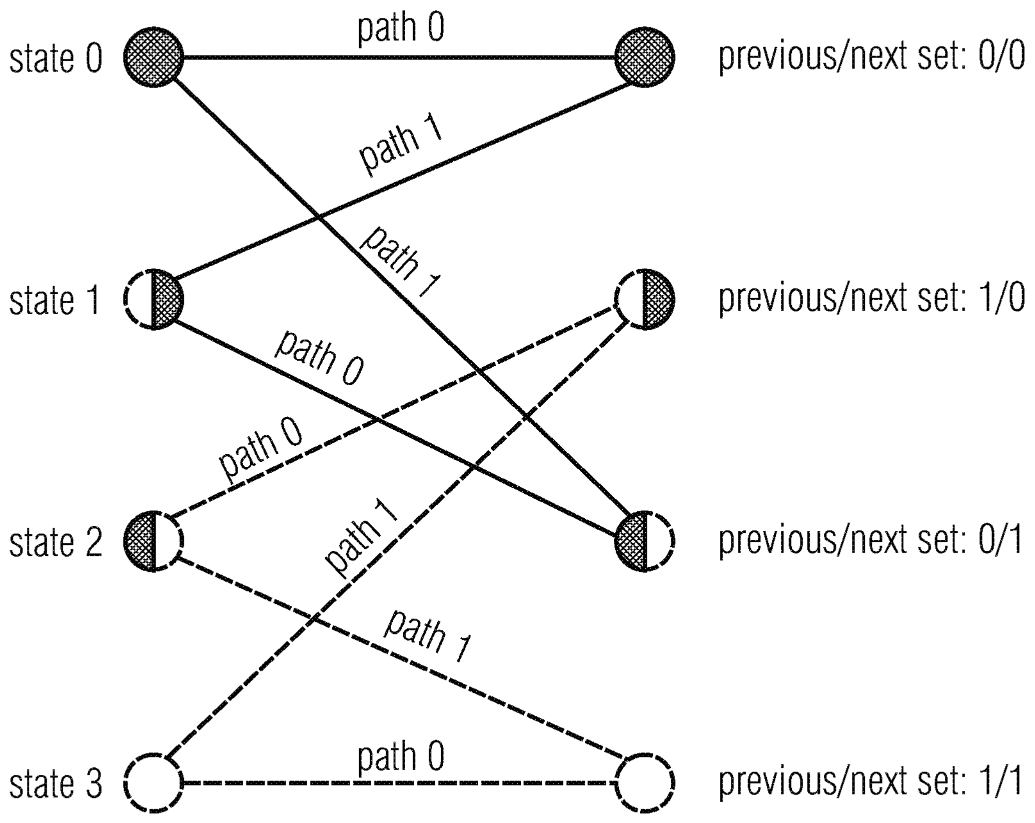
FIG. 15 shows an example of a basic trellis cell.

The trellis consists of a concatenation of so-called basic trellis cells. An example for such a basic trellis cell is shown in FIG. 15. It should be noted that one is not restricted to trellises with 4 states. In other embodiments, the trellis can have more states. In particular, any number of states that represents an integer power of 2 is suitable. Even if the trellis has more than 2 states, each node for a current transform coefficient is typically connected with two states for the previous transform coefficient and two states of the next transform coefficients. It is, however, also possible that a node is connected with more than two states of the previous transform coefficients or more than two states of the next transform coefficients. Note that a fully connected trellis (each state is connected with all states of the previous and all states of the next transform coefficients) would correspond to independent scalar quantization.

Figure 16:
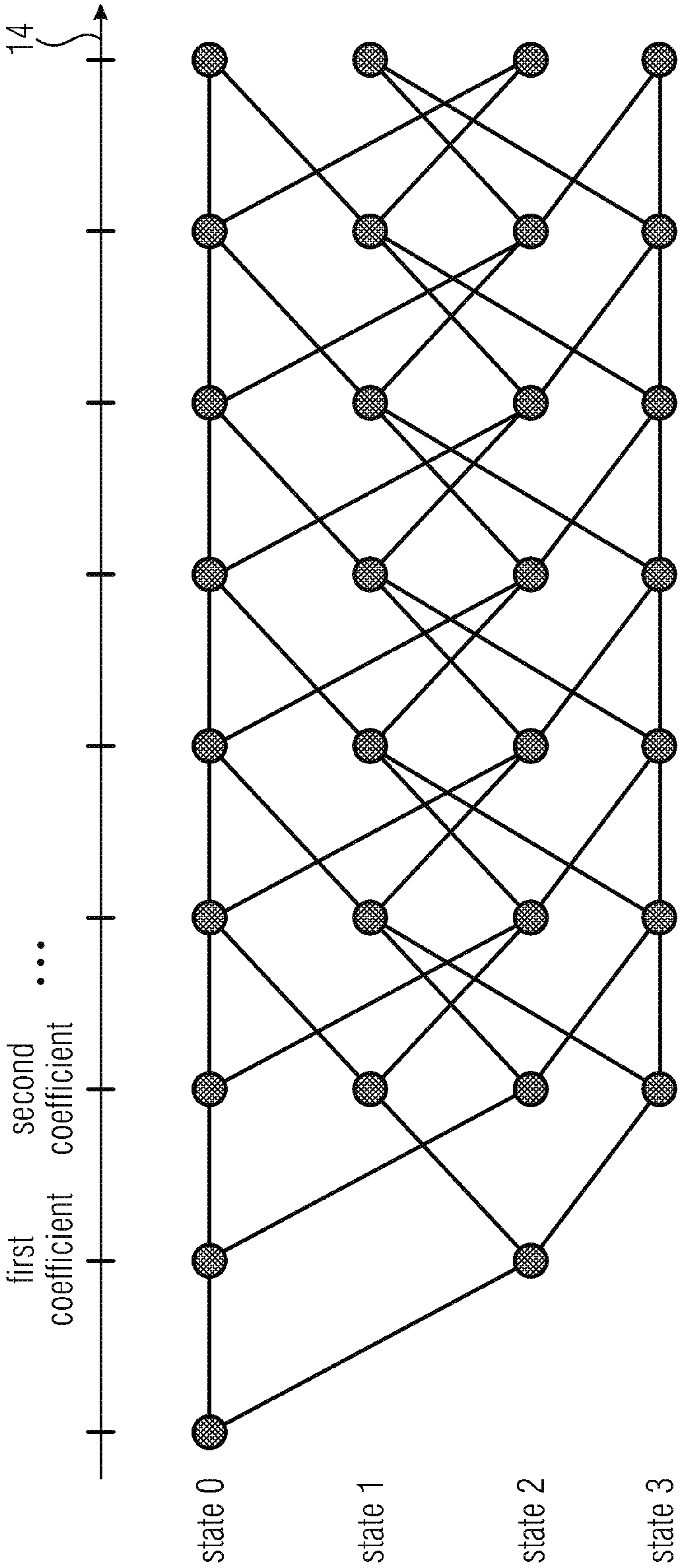
FIG. 16 shows a schematic diagram of a trellis example for dependent scalar quantization of 8 transform coefficients. The first state (left side) represents an initial state, which is set equal to 0 in this example.

In an embodiment, the initial state cannot be freely selected (since it would entail some side information rate to transmit this decision to the decoder). Instead, the initial state is either set to a pre-defined value or its value is derived based on other syntax elements. In this case, not all paths and states are available for the first transform coefficients (or the first transform coefficients starting with the first non-zero transform coefficients). As an example for a 4-state trellis, FIG. 16 shows a trellis structure for the case that the initial state is set equal to 0.

Figure 17A:
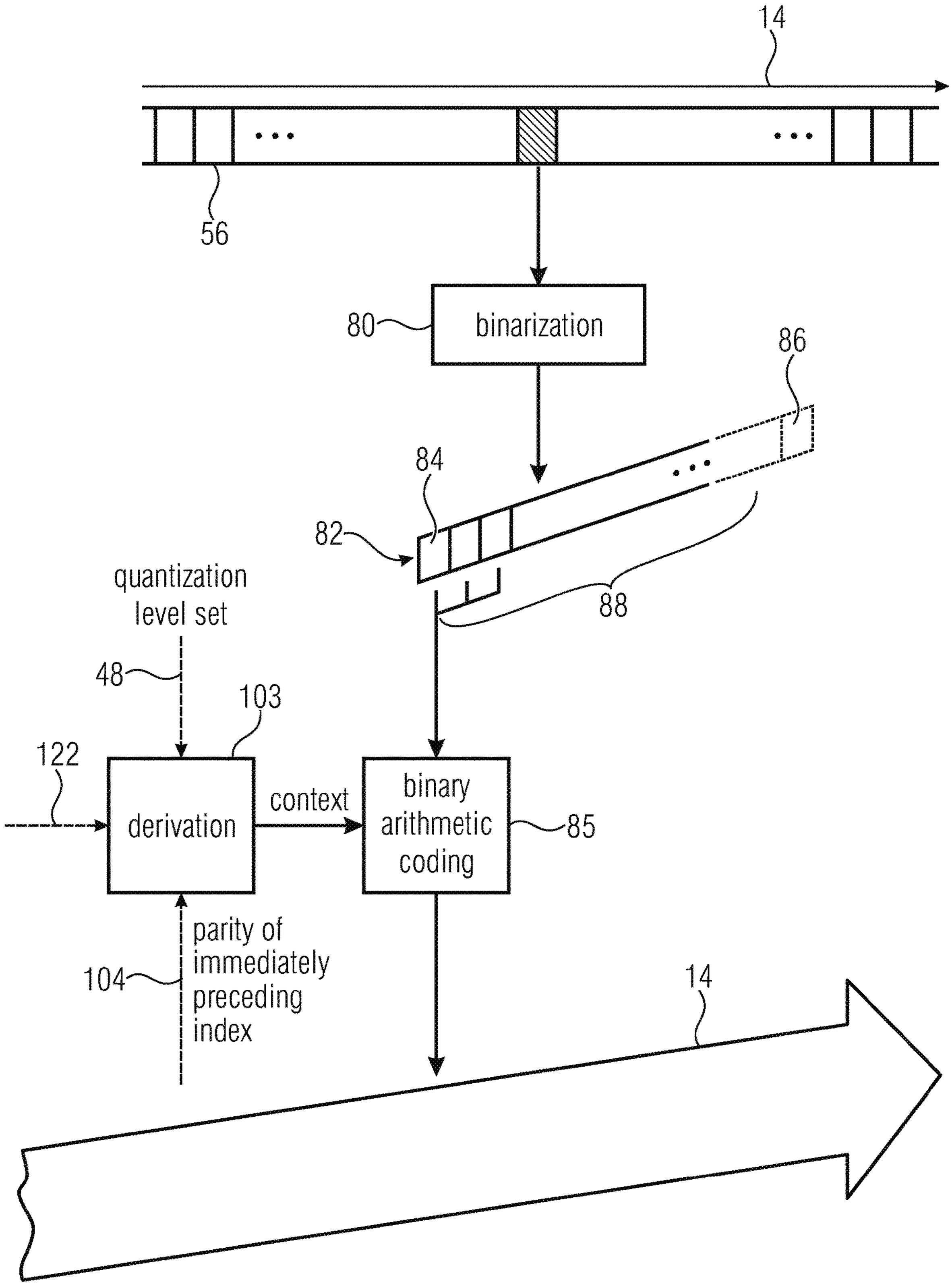
FIG. 17*a* shows a schematic diagram of a concept for entropy decoding quantization levels performed within an encoder for encoding transform coefficients according to an embodiment such as by the entropy decoder in FIG. 6*b;*
Figure 17B:
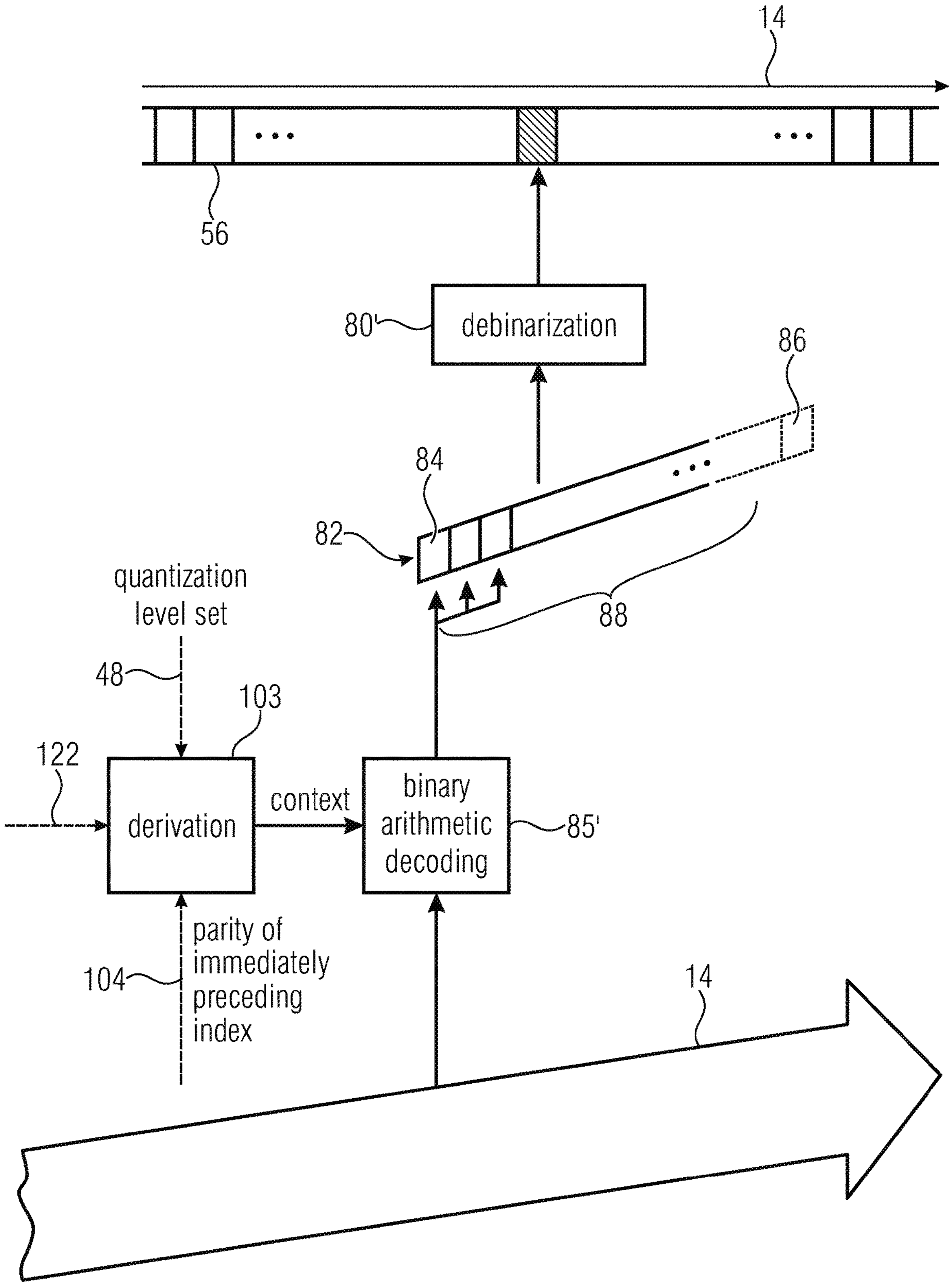
FIG. 17*b* shows a schematic diagram of a concept for entropy encoding quantization levels performed within an encoder for encoding transform coefficients according to an embodiment such as by the entropy encoder in FIG. 6*a;*

One aspect of dependent scalar quantization is that there are different sets 52 of admissible reconstruction levels (also called quantization sets) for the transform coefficients 13. The quantization set 48 for a current transform coefficient is determined 54 based on the values 58 of the quantization indexes for preceding transform coefficients. If we consider the example in FIG. 10*a* and compare the two quantization sets, it is obvious that the distance between the reconstruction level equal to zero and the neighboring reconstruction levels is larger in set 0 than in set 1. Hence, the probability that a quantization index is equal to 0 is larger if set 0 is used and it is smaller if set 1 is used. In an embodiment, this effect is exploited in the entropy coding of the quantization indices 56 into the bitstream 14 by switching codeword tables or probability models based on the quantization sets (or states) that are used for a current quantization index. This concept is depicted in FIGS. 17*a* and 17*b* by exemplarily using binary arithmetic coding.

Note that for a suitable switching of codeword tables or probability models, the path (association with a subset of the used quantization set) of all preceding quantization indexes need to be known when entropy decoding a current quantization index (or a corresponding binary decision of a current quantization index). Therefore the transform coefficients 13 are coded in reconstruction order 14. Hence, in an embodiment, the coding order 14 of transform coefficients 13 is equal to their reconstruction order 14. Beside that aspect, any coding/reconstruction order of quantization indexes is possible, such as the zig-zag scan order specified in the video coding standards H.262|MPEG-2 Video or H.264|MPEG-4 AVC, the diagonal scan specified in H.265|MPEG-H HEVC, the horizontal or vertical scan additionally specified in H.265|MPEG-H HEVC, are any other uniquely defined order.

Figure 18:
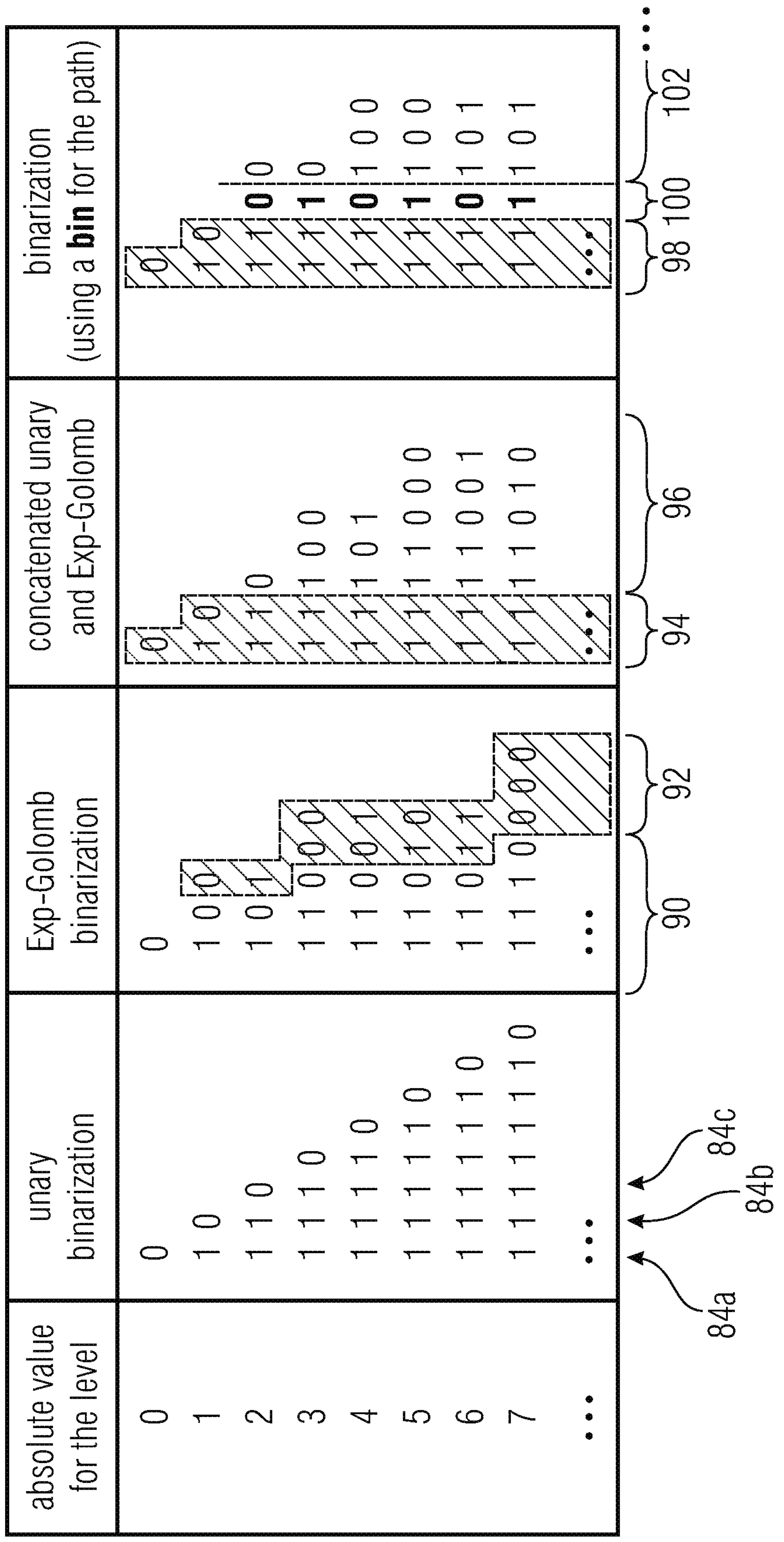
FIG. 18 shows a table with examples for the binarization of the absolute values of quantization indexes. From left to right: (a) Unary binarization; (b) Exp-Golomb binarization; (c) Concatenated binarization consisting of a unary prefix part (first two bins marked blue) and an Exp-Golumb suffix part; (d) Concatenated binarization consisting of a unary prefix part (first two bins marked blue), a bin indicating the path/parity (red) and an Exp-Golumb suffix part (individual code for both paths/parties)

In an embodiment, the quantization indexes 56 are coded using binary arithmetic coding. For that purpose, the non-binary quantization indexes 56 are first mapped 80 onto a series 82 of binary decisions 84 (which are commonly referred to as bins). The quantization indexes 56 are often transmitted as absolute value 88 and, for absolute values greater than 0, a sign 86. While the sign 86 is transmitted as single bin, there are many possibilities for mapping the absolute values 88 onto a series 82 of binary decisions 84. In the table of FIG. 18, four example binarization methods are shown. The first is a so-called unary binarization. Here, the first bin 84*a* indicates whether the absolute value is greater than 0. The second bin 84*b* (if present) indicates whether the absolute value is greater than 1, the third bin 84*c* (if present) whether the absolute value is greater than 2, etc. The second example is the Exp-Golomb binarization, which consists of a unary part 90 and a fixed-length part 92. As third example, a binarization scheme is shown, which consists of two unary coded bins 94 and a suffix part 96 that is represented using an Exp-Golomb code. Such binarization schemes are often used in practice. The unary bins 94 are typical coded using adaptive probability models, while the suffix part is coded using fixed probability models with a pmf (0.5,0.5). The number of unary bins is not restricted to be equal to 2. It can be greater than 2, and it can actually vary for the transform coefficients inside a transform block. Instead of the Exp-Golomb code, any other uniquely decodable code can be used for representing the suffix part 96. For example, an adaptive Rice code (or a similar parameterized code) may be used, where the actual binarization depends on the values of the quantization indexes that are already coded for the current transform block. The last example binarization scheme in FIG. 18 also starts with a unary part 98 (where the first bin specifies whether the absolute value is greater than 0 and the second bin specifies whether the absolute value is greater than 1), but the next bin 100 specifies the parity of the absolute value, finally the remainder is represented using an Exp-Golomb code 102 (note that a separate Exp-Golomb code is used for each of the two values of the parity bin). As noted for the previous binarization scheme, the Exp-Golomb code 102 could be replaced with any other uniquely decodable code (such as a parametrized Rice code, a unary code, or any concatenation of different codes) and the number of unary coded bins in 98 could be increased, or decreased, or even adapted for the different transform coefficients in a transform block.

At least a part of bins for the absolute levels is typically coded using adaptive probability models (also referred to as contexts). In an embodiment, the probability models of one or more bins are selected 103 based on the quantization set 48 (or, more generally, the corresponding state variable) for the corresponding transform coefficient the quantization index 56 belongs to. The chosen probability model or context can depend on multiple parameters or properties of already transmitted quantization indexes, but one of the parameters is the quantization set 48 or state that applies to the quantization index being coded.

In an embodiment, the syntax for transmitting the quantization indexes of a transform block includes a bin like 84*a* or the first bin in 90, 94, 98 that specifies whether the quantization index 56 is equal to zero or whether it is not equal to 0. The probability model that is used for coding this bin is selected among a set of two or more probability models or contexts or context models. The selection of the probability model used depends on the quantization set 48 (i.e., the set of reconstruction levels) that applies to the corresponding quantization index. In another embodiment, the probability model used depends on the current state variable (the state variables implies the used quantization set) or, in different words, the quantization sets 48 and the parities 104 of the two (or more) immediately preceding coefficients.

In a further embodiment, the syntax for transmitting the quantization indexes includes a bin that specifies whether the absolute value of a quantization index (transform coefficient level) is greater than one, such as 84*b* or the second bin 90, 94 and 98. The probability model that is used for coding this bin is selected 103 among a set of two or more probability models. The selection of the probability model used depends on the quantization set 48 (i.e., the set of reconstruction levels) that applies to the corresponding quantization index.

In another embodiment, the probability model used depends on the current state variable (the state variables implies the used quantization set) or, in different words, the quantization sets 84 and the parities 104 of immediately preceding coefficients.

In another embodiment, the syntax for transmitting the quantization indexes of a transform block includes a bin that specifies whether the quantization index is equal to zero or whether it is not equal to 0 and a bin that specifies whether the absolute value of a quantization index (transform coefficient level) is greater than one. The selection 103 of the probability models for both bins depend on the quantization set or the state variable for the current quantization index. Alternatively, only the selection 103 of the probability model for the first bin (i.e., the bin that indicates whether the quantization index is equal or not equal to zero) depend on the quantization set or the state variable for the current quantization index.

It should be noted that the quantization set 48 or the state variable determining 48 and 104 can only be used for selecting the probability models if (at least) the path variables (e.g., given by the parity) for the preceding quantization indexes in coding order are known. This is, for example, not the case if the quantization indexes were coded on the basis of 4×4 subblocks with for each subblock, transmitting the quantization indexes using multiple passes over the corresponding 4×4 array of transform coefficients, similar to HEVC. In HEVC, in the first pass over a 4×4 subblock, the flags sig_coeff_flag were transmitted, which indicate whether a corresponding quantization index is unequal to zero. In a second pass, for the coefficients with sig_coeff_flag equal to 1, the flags coeff_abs_level_greater1_flag were transmitted, which indicate whether the absolute value of a corresponding quantization index is greater than 1. At most 8 of these flags were transmitted for a subblock. Next, the flag coeff_abs_level_greater2_flag was transmitted for the first quantization index (if any) with coeff_abs_level_greater1_flag equal to 1. Then the sign flags were transmitted for the entire subblock. And finally, the non-binary syntax elements coeff_abs_level_remaining were transmitted, which specify the remainder for the absolute values of the quantization indexes (transform coefficient levels). For transmitting the non-binary syntax elements coeff_abs_level_remaining, an adaptive Rice code might be used. In such a case, there is no sufficient information for determining 48 and 104 in the first passes.

In order to use a selection of probability models that depends on a current set of reconstruction levels (or a state variable), the coding order of bins are changed.

There are two basic possibilities:

In an embodiment, all bins 82 that specify the absolute value 88 of a quantization index 56 are consecutively coded. That means, all bins 82 (for the absolute values 88) of all preceding quantization indexes 56 in coding/reconstruction order 14 are coded before the first bin of a current quantization index is coded. The sign bins 86, i.e., along path 14, may or may not be coded in a second pass over the transform coefficients 13 (that may actually depend on the used quantization sets). The sign bins for a subblock may be coded after the bins for the absolute values of the subblock, but before any bins for the next subblock. In such a case, a least significant bit portion of a binary representation of the previous absolute quantization indexes such as the LSB itself may be used to control the selection 54.

In another embodiment, only a subset of the bins that specify the absolute value of a quantization index are consecutively coded in a first pass over the transform coefficients. But these bins uniquely specify the quantization set (or the state variable). The remaining bins are coded in one or more additional passes over the transform coefficients. Such an approach can, for example, be based on a binarization scheme similar to the one shown in the right column of the table in FIG. 18. This includes, in particular, approaches (as the one exemplified in the right column of FIG. 18) in which the binarization contains an explicit parity flag. If we assume that the path is specified by the parity of the quantization index, it is sufficient to transmit the unary part 98 and the parity bin 100 in the first pass over the transform coefficients. However, it is also possible that the first pass includes one or more additional bins. The remaining bins included in 102 can be transmitted in one or more additional passes. In other embodiments, similar concepts are used. For example, the number of unary bins can be modified or even adapted based on already transmitted symbols, i.e., along path 14. And different adaptive or non-adaptive codes (for example, adaptive Rice codes as in H.265|MPEG-H HEVC) can be used instead of the Exp-Golomb code. The different passes can be used on the basis of subblocks, in which case the bins for a subblock are coded in multiple passes, but all bins of a subblock are transmitted before any bin of the next subblock is transmitted.

FIG. 17*b* shows the entropy decoding process for the quantization indexes 56 and, thus, a reverse of FIG. 17*a*, wherein entropy decoding 85' of the bins 82 and mapping 80' (inverse of binarization) the bins 82 to levels 56 is performed inversely and context derivation 103 in the same manner.

One aspect which should be noted is that the dependent quantization of transform coefficients may advantageously be combined with an entropy coding, when the selection of a probability model for one or more bins of the binary representation of the quantization indexes (which are also referred to as quantization levels) depends on the quantization set 48, i.e., along path 14, (set of admissible reconstruction levels) or a corresponding state variable for the current quantization index i.e., 48 and 104. The quantization set 48 (or state variable) is given by the quantization indexes (or a subset of the bins representing the quantization indexes) for the preceding transform coefficients in coding and reconstruction order.

In accordance with some embodiments, the described selection of probability models is combined with one or more of the following entropy coding aspects:

The transmission of a flag for the transform block, which specifies whether any of the quantization indexes for the transform block is not equal to zero or whether all quantization indexes for the transform block are equal to zero.

The partitioning of the coefficients of a transform block (at least, for transform blocks 10 that exceed a pre-defined size given by the dimensions of the block or the number of contained samples) into multiple subblocks 120. If a transform block is partitioned into multiple subblocks, then for one or more of the subblocks 12 a flag is transmitted (unless it is inferred based on already transmitted syntax elements) that specifies whether the subblock contains any non-zero quantization indexes. The subblocks may also be used for specifying the coding order of bins. For example, the coding of bins can be splitted into subblocks 12, so that all bins of a subblock are coded before any bin of the next subblock is transmitted. But the bins for a particular subblock can be coded in multiple passes over the transform coefficients inside this subblock. For example, all bins specifying the absolute values of the quantization indexes for the subblock may be coded before any sign bin is coded. The bins for the absolute values can also be split into multiple passes, as discussed above.

The transmission of the location of the first non-zero quantization index in coding order. The location can be transmitted as x and y coordinates specifying a position in the 2d array of transform coefficients 13, it can be transmitted as an index into the scan order, or it can be transmitted by any other means.

Figure 19B:
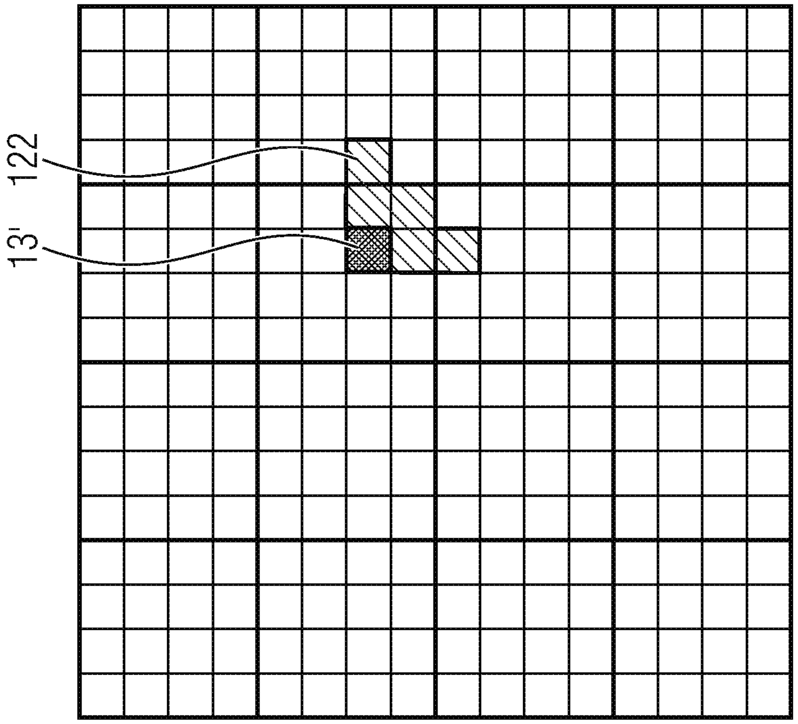
FIG. 19*b* shows a schematic diagram of a transform block for illustration of concepts for the entropy coding of transform coefficient levels: Example for a template that is used for selecting probability models for one or more bins.
Figure 19A:
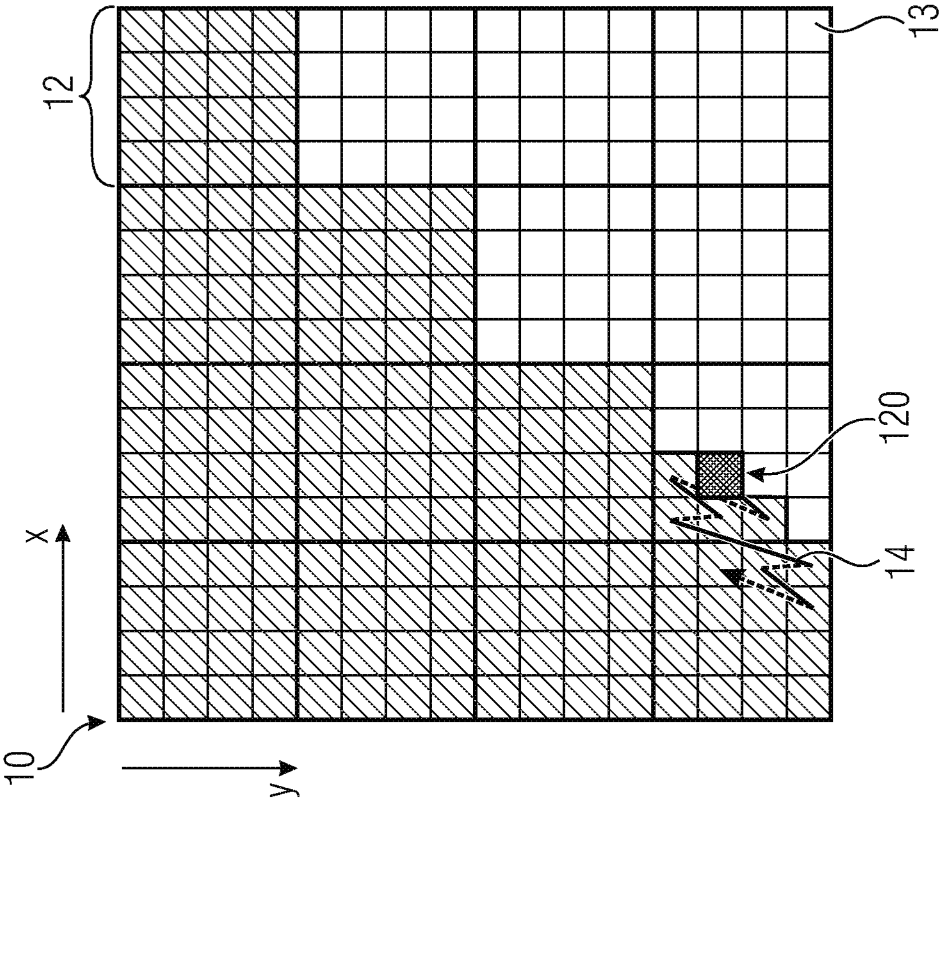
FIG. 19*a* shows a schematic diagram of a transform block for illustration of concepts for the entropy coding of transform coefficient levels: Signaling of the position of the first non-zero quantization index in coding order (black sample). In addition to the position of the first non-zero transform coefficients, only bins for the blue-marked coefficients are transmitted, the white-marked coefficients are inferred to be equal to 0.

As illustrated in FIG. 19*a*, the transmitted location of the first non-zero quantization index 120 (or transform coefficient 120) in coding order 14 specifies that all transform coefficients that precede the identified coefficient 120 in coding order 14 (non-hatched in FIG. 19*a*) are inferred to be equal to zero. Further data 15 are only transmitted for the coefficient at the specified location 120 and the coefficients that follow this coefficient 120 in coding order 14 (marked hatched in FIG. 19*a*). The example in FIG. 19*a* shows a 16×16 transform block 10 with 4×4 subblocks 12; the used coding order 14 is the subblock-wise diagonal scan specified in H.265|MPEG-H HEVC. It should be noted that the coding for the quantization index 56 at the specified location (first non-zero coefficient in coding order 120) may be special. For example, if the binarization for the absolute values of the quantization indexes comprises a bin that specifies whether a quantization index is not equal to 0, this bin is not send for the quantization index at the specified location (it is already know that the coefficient is not equal to 0), instead the bin is inferred to be equal to 1.

The absolute values of the quantization indexes are transmitted using a binarization scheme that consists of a number of bins that are coded using adaptive probability models and, if the adaptive coded bins do not already completely specify the absolute value, a suffix part like 92, 96 and 102 that is coded in the bypass mode of the arithmetic coding engine (non-adaptive probability model with a pmf (0.5, 0.5) for all bins). The binarization used for the suffix part may additionally depend on the values of the already transmitted quantization indexes.

The binarization for the absolute values of the quantization indexes includes an adaptively coded bin that specifies whether the quantization index is unequal to 0 such as 84*a* or the first one in 90, 94 or 98. The probability model (also referred to as context) used for coding this bin is selected among a set of candidate probability (context) models. The selected candidate probability model may not only be determined by the quantization set 48 (set of admissible reconstruction levels) or state variable for the current quantization index (48 and 104), but, in addition, it is also determined by already transmitted quantization indexes (or the bins specifying a part of the quantization indexes, as described above) for the transform block 10 or indexes 56 (or parts thereof) of coefficients 13 preceding the current quantization index in coding order 16. In an embodiment, the quantization set 48 (or state variable) determines a subset (also called context set) of the available probability models and the values of already coded bins for quantization indexes determine the used probability model inside this subset (context set).

In a first embodiment, the used probability model inside a context set is determined by the values of the coded_subblock_flag's (which specify whether a subblock includes any non-zero quantization indexes) of neighboring subblocks (similar to H.265|MPEG-H HEVC).

In another embodiment, the used probability model inside a context set is determined based on the values of the already coded quantization indexes (or already coded bins for the quantization indexes) in a local neighborhood 122 of the current transform coefficient. An example for such a local neighborhood may be called a template 122 and is shown in FIG. 19*b*. In the figure, the current transform coefficient 13' is marked black and the local neighborhood 122 is marked hatched. In the following, some example measures are listed that can be derived based on the values of the quantization indexes (or partly reconstructed quantization indexes, which are given by the bins that are transmitted before the current bin) in the local neighborhood 122 and can, then, be used for selecting a probability model of the predetermined context set:

The number of quantization indexes not equal to 0 inside the local neighborhood 122. This number can possibly be clipped to a maximum value; and/or The sum of the absolute values of the quantization indexes in the local neighborhood 122. This number can be clipped to a maximum value; and/or The difference of the sum of the absolute values of the quantization indexes in the local neighborhood and number of quantization indexes not equal to 0 inside the local neighborhood. This number can be clipped to a maximum value.

For coding orders in which the bins for the absolute values of the quantization indexes are transmitted in multiple passes (as discussed above), the above mentioned measured are calculated using the bins that have been transmitted. That means instead of the complete absolute values (which are not known), partially reconstructed absolute values are used.

In this context, instead of the quantization indexes (which are the integer numbers that are transmitted inside the bitstream), the integer factors of the quantization step sizes can be used. These factors are the variables n in the pseudo-code examples in FIG. 9*a*, FIG. 9*b*, FIG. 11, and FIG. 13. They represent the quotient of the reconstructed transform coefficient and the quantization step sizes (rounded to the nearest integer).

Furthermore, other data available to the decoder can be used (explicitly or in combination with the measures listed above) for deriving the probability model inside the predetermined context set. Such data include:

The position of the current transform coefficient 13' (x coordinate, y coordinate, number of the diagonal, or any combination thereof) in the block 10.

The size of the current block 10 (vertical size, horizontal size, number of samples, or any combination thereof).

The aspect ratio of the current transform block 16.

The binarization for the absolute values of the quantization indexes includes an adaptively coded bin that specifies whether the absolute value of the quantization index is greater than 1. The probability model (as referred to a context) used for coding this bin is selected among a set of candidate probability models. The selected probability model may not only be determined by the quantization set 48 (set of admissible reconstruction levels) or state variable for the current quantization index, i.e., 48 and 104, but it is also or exclusively determined by already transmitted quantization indexes for the transform block. In an embodiment, the quantization set (or state variable) determines a subset (also called context set) of the available probability models and the data of already coded quantization indexes determines the used probability model inside this subset (context set). In another embodiment, the same context set is used for all quantization sets/state variables, and the data of already coded quantization indexes determines the used probability model. For selecting the probability models, any of the methods described above (for the bin specifying whether a quantization index is unequal to 0) can be used.

An adaptive selection between dependent and independent scalar quantization may be applied. In one embodiment, transform coding with dependent quantization (and, potentially, an adapted entropy coding of the quantization indexes) is applied to all transform blocks. Exceptions can be blocks that are coded in a lossless coding mode (i.e., without any quantization) or a coded mode that does not include a transform.

It is also possible that the codec comprises two modes of transform coding: (a) conventional transform coding with independent scalar quantization and (b) transform coding with dependent quantization. Which of the two transform coding methods (transform coding with independent or dependent scalar quantization) is used for a transform block may be explicitly signaled to the decoder using appropriate syntax elements or it may be derived based on other syntax elements. It is also possible that it is first explicitly signaled whether transform coding with dependent quantization is enabled, and, then (if enabled) it is derived based on other syntax elements whether transform coding with dependent quantization is actually used for a transform block.

The explicit signaling may comprise one or more of the following methods:

High-level syntax elements (typically, flags) that are transmitted in a high-level syntax structure such as sequence parameter sets, picture parameter sets, or slice headers indicate whether transform coding with dependent quantization or conventional transform coding with independent scalar quantization is used. In this context, it is possible that the usage of dependent quantization is only enabled/disabled for luma or chroma blocks (or, more generally, blocks of certain color channels). In another embodiment, the high-level syntax elements indicate whether transform coding with dependent quantization is enabled for a coded video sequence, a picture, or a slice (it is possible that transform coding with dependent quantization is only enabled for luma or chroma blocks). If transform coding with dependent quantization is enabled for a coded video sequence, a picture, or a slice, the actual decision which of the transform coding methods is used for a block may be derived based on certain block parameters (see below). Again, dedicated syntax elements may be used for signaling different settings for luma and chroma blocks. [0213] The syntax may include low-level syntax elements (i.e., syntax elements on a block basis), which specify whether transform coding with dependent quantization or conventional transform coding is used for the corresponding blocks. Such syntax elements may be transmitted on a CTU basis, a CU basis, a transform block basis, etc. If such a syntax elements is coded for entities that includes multiple transform blocks, it applies to all contained transform blocks. It may, however, only apply to transform blocks of certain color channels (e.g., only luma block or only chroma blocks).

In addition to an explicit signaling, the decision whether a transform block is coded using dependent or independent quantization of the transform coefficients could be derived based on parameters for the corresponding block. These parameters have to be coded (or derived based on other already transmitted syntax elements) before the actual quantization indexes for the transform coefficients of the block are transmitted. Among other possibilities, the block-adaptive decision could be based on one or more of the following parameters:

Block quantization parameter: For example, for blocks with a quantization parameter (QP) less than a particular threshold (which may also be indicated in a high-level syntax structure), transform coding with dependent quantization is used, and for blocks with a QP greater than or equal to the threshold, conventional transform coding with independent scalar quantization is used.

Location of the first non-zero quantization index in coding order: Given the location of the first non-zero coefficient, the number of actually transmitted quantization indexes (excluding the quantization indexes that are inferred to be equal to 0 based on a transmitted location of the first non-zero quantization index) can be derived. As an example, dependent quantization is used for blocks for which the number of actually transmitted quantization indexes is greater than a threshold (the threshold may or may not depend on the size of the block or the number of samples inside the block), and for all other blocks, independent scalar quantization is used.

In addition to the location of the first non-zero coefficient, the flags indicating whether a subblock contains any non-zero quantization index can be used for determining the number of actual transmitted quantization indexes. In this case, the so-called coded subblock flags (which indicate whether a subblock contains any non-zero coefficients) have to be coded before the first quantization index is coded.

The size of the transform block (horizontal size, vertical size, or the number of samples in the transform block).

The transform (or type of transform) that is used for the reconstructing the transform block. Such a criteria could apply in video codecs which support multiple transforms.

Any combination of the criteria specified above.

For embodiments, in which both transform coding with dependent scalar quantization and conventional transform coding (with independent scalar quantization) can be used together in a picture or slice, it can be of advantage to use different relationships between the quantization step size and the quantization parameter for the two approaches. For example, the decoder may comprise one table for mapping the block quantization parameter to quantization step sizes used for independent quantization and another table for mapping the block quantization parameter to quantization step sizes used for dependent quantization. Alternatively, the decoder may comprise a single table for mapping quantization parameters to quantization step sizes (as in H.265|MPEG-H AVC), but for transform blocks that use dependent scalar quantization, the quantization step size is multiplied by a pre-defined factor, before it is used in the reconstruction process of transform coefficients. Note, that for reconstructing transform coefficients, the multiplication with a quantization step size may be actually implemented as a combination of a multiplication and a bit shift. Then, the multiplication of the nominal quantization step size with a pre-defined factor may be implemented as a modification of the bit shift and a modification of the scaling factor. As a further alternative, for transform blocks coded using dependent quantization an offset can be added to (or subtracted from) the quantization parameter before it is mapped to the used quantization step size.

Furthermore, for transform coding with dependent quantization, the quantization step size used can be adapted based on the number of transform coefficients. For that purpose, any of the techniques described above for modifying the quantization size can be used (look-up table, multiplication factor, modification of the scale and bit shift parameters). The number of actually transmitted quantization indexes can be determined by one or more of the following methods (or by any other means):

The number of transmitted quantization indexes can be derived based on the location of the first non-zero quantization index in coding order (see above).

The number of transmitted quantization indexes can be derived based on the location of the first non-zero quantization index in coding order and the values of transmitted coded subblock flags (a coded_subblock_flag indicates whether a subblock contains any non-zero quantization indexes or, alternatively, any non-zero transform coefficients).

The number of transmitted quantization indexes (for determining the quantization step size) can be derived based on the number of non-zero quantization indexes inside the transform block.

Note that the quantization step size does not need to be known for entropy decoding of quantization indexes, only for the actual reconstruction of transform coefficients. Hence, any syntax elements and derived parameters can be used for calculating the quantization step size used in the reconstruction of transform coefficients.

As an example method for encoding, the following description is provided.

For obtaining bitstreams that provide a very good trade-off between distortion (reconstruction quality) and bit rate, the quantization indexes should be selected in a way that a Lagrangian cost measure $$D + \lambda \cdot R = \sum_k D_k + \lambda \cdot R_k = \sum_k \alpha_k \cdot (t_k - t'_k)^2 + \lambda \cdot R\left(q_k \mid q_{k-1}, q_{k-2}, \ldots\right)$$

is minimized. For independent scalar quantization, such a quantization algorithm (referred to as rate-distortion optimized quantization or RDOQ) was discussed in above. But in comparison to independent scalar quantization, we have an additional difficulty. The reconstructed transform coefficients $t'_k$ and, thus, their distortion $D_k=(t_k-t'_k)^2$, do not only depend on the associated quantization index $q_k$, but also on the values of the preceding quantization indexes in coding order.

Figure 20:
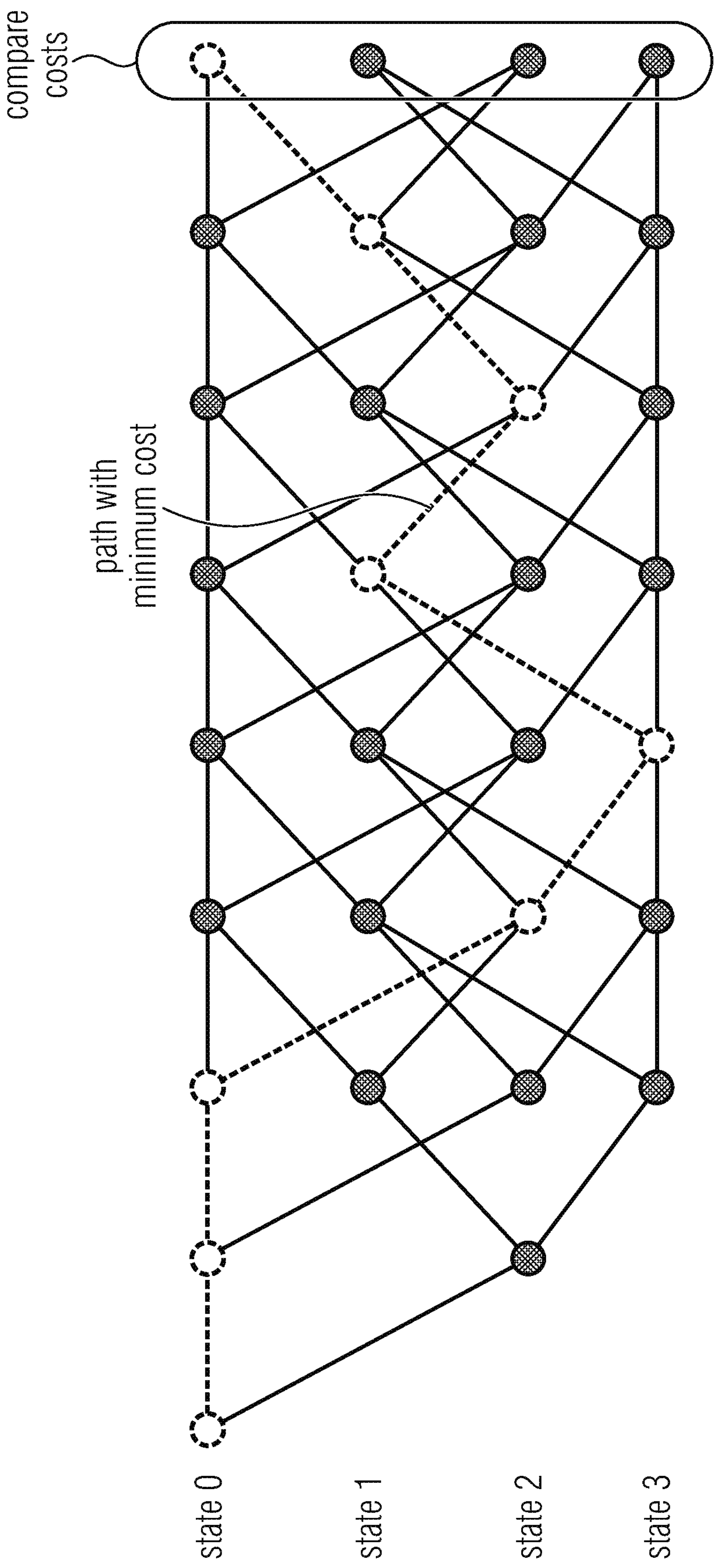
FIG. 20 shows a schematic diagram of an example for a trellis structures that can be exploited for determining sequences (or blocks) of quantization indexes that minimize a cost measures (such as an Lagrangian cost measure D+λ·R). The trellis structure represents a further example of dependent quantization with 4 states (see FIG. 16). The trellis is shown for 8 transform coefficients (or quantization indexes). The first state (at the very left) represents an initial state, which is assumed to be equal to 0.

However, as we have discussed in above, the dependencies between the transform coefficients can be represented using a trellis structure. For the further description, we use the embodiment given in FIG. 10*a* as an example. The trellis structure for the example of a block of 8 transform coefficients is shown in FIG. 20. The paths through the trellis (from the left to the right) represent the possible state transitions for the quantization indexes. Note that each connection between two nodes represents a quantization index of a particular subset (A, B, C, D). If we chose a quantization index $q_k$ from each of the subsets (A, B, C, D) and assign the corresponding rate-distortion cost $$J_k = D_k(q_k \mid q_{k-1}, q_{k-2}, \ldots) + \lambda \cdot R_k(q_k \mid q_{k-1}, q_{k-2}, \ldots)$$

to the associated connection between two trellis nodes, the problem of determining the vector/block of quantization indexes that minimizes the overall rate-distortion cost $D+\lambda \cdot R$ is equivalent to finding the path with minimum cost path through the trellis (from the left to the right in FIG. 20). If we neglect some dependencies in the entropy coding (similar to RDOQ), this minimization problem can be solved using the well-known Viterbi algorithm.

An example encoding algorithm for selecting suitable quantization indexes for a transform block could consist of the following main steps:

1. Set the rate-distortion cost for the initial state equal to 0.

2. For all transform coefficients in coding order, do the following:

a. For each subset A, B, C, D, determine the quantization index that minimizes the distortion for the given original transform coefficient.

b. For all trellis nodes (0, 1, 2, 3) for the current transform coefficient, do the following:

i. Calculate the rate-distortion costs for the two paths that connect a state for the preceding transform coefficient with the current state. The costs are given as the sum of the cost for the preceding state and the cost $D_k+\lambda\cdot R_k$, where $D_k$ and $R_k$ represent the distortion and rate for choosing the quantization index of the subset (A, B, C, D) that is associated with the considered connection.

ii. Assign the minimum of the calculated costs to the current node and prune the connection to the state of the previous transform coefficient that does not represent the minimum cost path.

Note: After this step all nodes for the current transform coefficient have a single connection to any node for the preceding transform coefficient.

3. Compare the costs of the 4 final nodes (for the last coefficient in coding order) and chose the node with minimum cost. Note that this node is associated with a unique path through the trellis (all other connection were pruned in the previous steps).

4. Follow the chosen path (specified by the final node) is reverse order and collect the quantization indexes that are associated with the connections between the trellis nodes.

Figure 21:
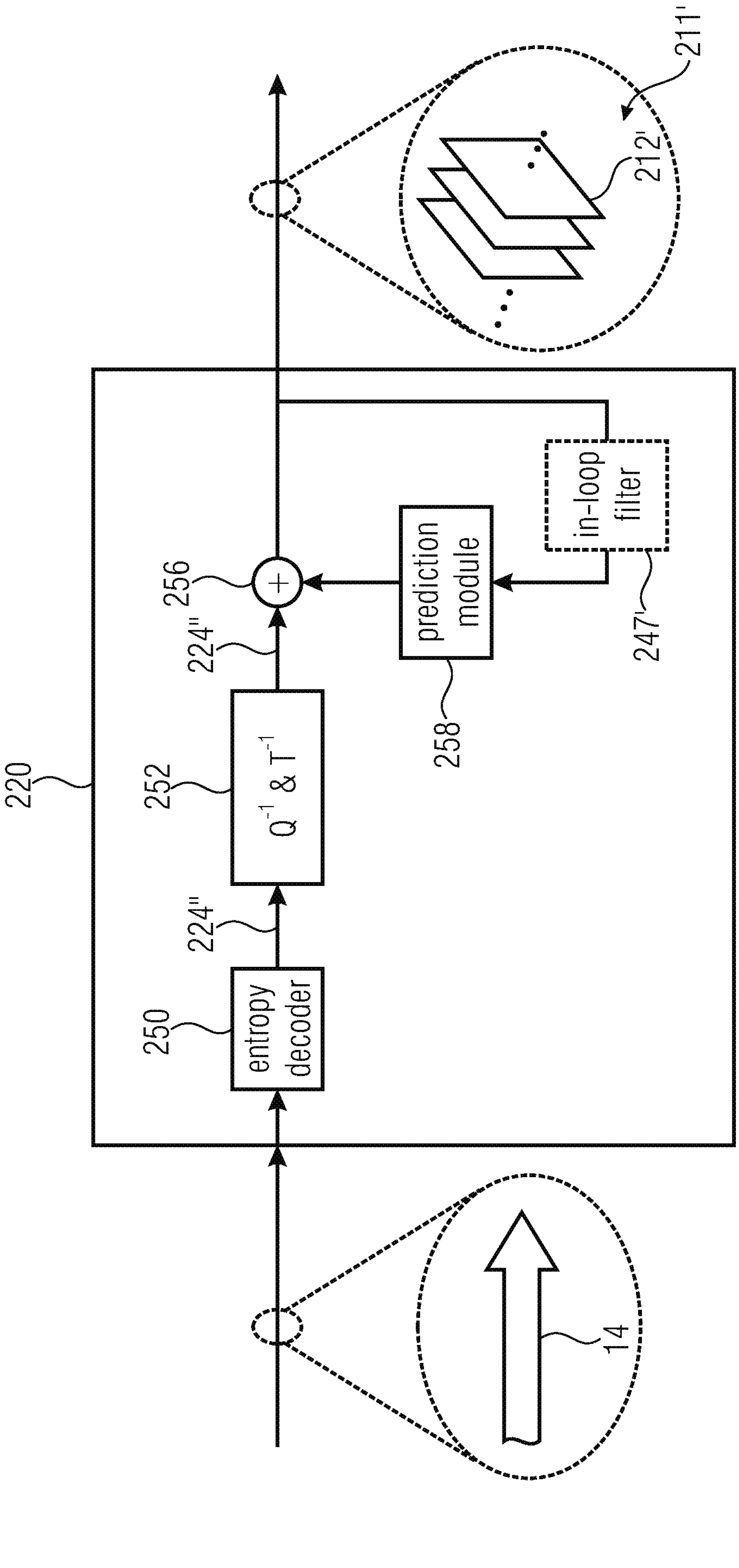
FIG. 21 shows a block diagram of a decoder which may be implemented to operate in accordance with an embodiment such as the one depicted in FIG. 7*b*, and fits to the encoder example of FIG. 1.

It should be noted that the determination of quantization indexes based on the Viterbi algorithm is not substantially more complex than rate-distortion optimized quantization (RDOQ) for independent scalar quantization. Nonetheless, there are also simpler encoding algorithms for dependent quantization. For example, starting with a pre-defined initial state (or quantization set), the quantization indexes could be determined in coding/reconstruction order by minimizing any cost measure that only considers the impact of a current quantization index. Given the determined quantization index for a current coefficient (and all preceding quantization indexes), the quantization set for the next transform coefficient is known. And, thus, the algorithm can be applied to all transform coefficients in coding order. Summarizing, the encoders shown in FIG. 1, 6*b*, 7*a*, and any combination thereof with 17*a*, represents an example for a media signal encoder of the present application. At the same time, FIG. 6*a*, 7*b*, and any combination thereof with 17*b*, represents an example for a media signal decoder of the present application. Nevertheless, just as a precautionary measure, and as FIG. 1 was primarily introduced as showing a structure used by HEVC encoders, it is again noted that FIG. 1 forms as possible embodiment, namely an apparatus for predictively coding a video 211 composed of a sequence of pictures 212 into a data stream 14. Block-wise predictive coding is used to this end. Further, transform-based residual coding is exemplarily used. The apparatus, or encoder, is indicated using reference sign 210. FIG. 21 shows a corresponding decoder 220, i.e. an apparatus 220 configured to predictively decode the video 211' composed of pictures 212' in picture blocks from the data stream 14, also here exemplarily using transform-based residual decoding, wherein the apostrophe has been used to indicate that the pictures 212' and video 211', respectively, as reconstructed by decoder 220 deviate from pictures 212 originally encoded by apparatus 210 in terms of coding loss introduced by the quantization of the prediction residual signal. FIG. 1 and FIG. 21 exemplarily use transform based prediction residual coding, although embodiments of the present application are not restricted to this kind of prediction residual coding or even to predictive coding including coding and quantization of the prediction residual.

The encoder 210 is configured to subject the prediction residual signal to spatial-to-spectral transformation and to encode the prediction residual signal, thus obtained, into the data stream 14. Likewise, the decoder 220 is configured to decode the prediction residual signal from the data stream 14 and subject the prediction residual signal thus obtained to spectral-to-spatial transformation.

Internally, the encoder 210 may comprise a prediction residual signal former 222 which generates a prediction residual 224 so as to measure a deviation of a prediction signal 226 from the original signal, i.e. video 211 or a current picture 212. The prediction residual signal former 222 may, for instance, be a subtractor which subtracts the prediction signal from the original signal, i.e. current picture 212. The encoder 210 then further comprises a transformation and quantization stage 228 which subjects the prediction residual signal 224 to any of the above-discussed transformations to obtain a transformed prediction residual signal, and subjects same to quantization. The quantization concept has been described above with respect to FIG. 7*a*. The thus quantized prediction residual signal 224" is coded into bitstream 14 and consists of the afore-mentioned quantization indexes 56. For sake of encoding into data stream 14, encoder 210 may optionally comprise an entropy coder 234 which entropy codes the prediction residual signal as transformed and quantized into data stream 14. The quantized prediction residual signal 224' as reconstructable at decoder side, is generated on the basis of the prediction residual signal 224" encoded into, and decodable from, data stream 14 by use of dequantization and inverse transformation stage 238 which dequantizes prediction residual signal 224" according to FIG. 7*b* so as to gain the reconstructed transform coefficients 13, and subject the transform composed of coefficients 13 to inverse transformation, such as one of the ones discussed above, to obtain the prediction residual signal 224', which corresponds to the original prediction residual signal 224 except for quantization loss. A combiner 242 then recombines, such as by addition, the prediction signal 226 and the reconstructed prediction residual signal 224" so as to obtain a reconstructed signal 246, i.e. a reconstruction of the original signal 212. Reconstructed signal 246 may correspond to signal 212' or represent a preliminary reconstructed signal which is to subject to in-loop filtering 247 to obtain the reconstruction signal 212', and/or to post-filtering (not shown in FIG. 1). A prediction module 244 then generates the prediction signal 226 on the basis of signal 246 by using, for instance, spatial prediction 248, i.e. intra prediction, and/or temporal prediction 249, i.e. inter prediction. Entropy coder 234 entropy codes not only the prediction residual 224" into the data stream 14, but also other coding data which describes the pictures such as, besides the residual data 224", prediction modes, prediction parameters, quantization parameters and/or filter parameters. The entropy coder 234 encodes all this data in a lossless manner into the data stream 14.

Likewise, decoder 220 may be internally composed of components corresponding to, and interconnected in a manner corresponding to the prediction loop formed by prediction module 244 and combiner 242 and the inverse of the stages 234 and 238. In particular, an entropy decoder 250 of decoder 220 may entropy decode the quantized spectral-domain prediction residual signal 224" from the data stream. Context derivation may be done in a manner synchronous with the encoder. The result is the coding data including, for instance, the prediction residual data 224". Thereupon, dequantization and inverse transformation module 252 dequantizes this signal according to FIG. 7*b* and inverse transforms same to obtain signal 224'", i.e. residual signal in spatial domain, and prediction module 258 and combiner 256 and optionally an in-loop filter 247' from a prediction loop feed by signal 224'" and corresponding to the loop in the encoder wherein the output of combiner 256 yields the reconstructed signal on the basis of prediction residual signal 224'" so that, as shown in FIG. 21, the output of combiner 256 yields the reconstructed signal, namely the video 211' or a current picture 212' thereof.

The encoder 210 may set some coding parameters including, for instance, prediction modes, motion parameters and the like, according to some optimization scheme such as, for instance, in a manner optimizing some rate and distortion related criterion, i.e. coding cost, and/or using some rate control, generally indicated as encoder control 213 in FIG. 1. As described, encoder 210 and decoder 220 and the corresponding modules 244, 258, respectively, support different prediction modes such as intra-coding modes and inter-coding modes. The granularity at which encoder and decoder switch between these prediction modes, as decided by some decision module 243, may correspond to a subdivision of the pictures 212 and 212', respectively, into blocks. Note that some of these blocks may be blocks being solely intra-coded and some blocks may be blocks solely being inter-coded and, optionally, even further blocks may be blocks obtained using both intra-coding and inter-coding. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 211 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 224", data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using assigned prediction modes and prediction parameters. Additionally, the data stream may comprise parameters controlling and signaling the subdivision of picture 212 and 212', respectively, into the blocks such as transform blocks from which the transform coefficient blocks 10 are obtained by transformation the transform blocks individually. The decoder 220 uses these parameters to subdivide the picture in the same manner as the encoder did, to assign the same prediction modes and parameters to the blocks, and to perform the same prediction to result in the same prediction signal, and to perform, for instance, the inverse transform on individual transform coefficient blocks 10 to yield one of the transform blocks. That is, the prediction signal may be obtained by intra-picture prediction using already reconstructed samples in a spatial neighborhood of the current picture block, or using motion-compensated prediction using samples of an already completely reconstructed picture.

Figure 22:
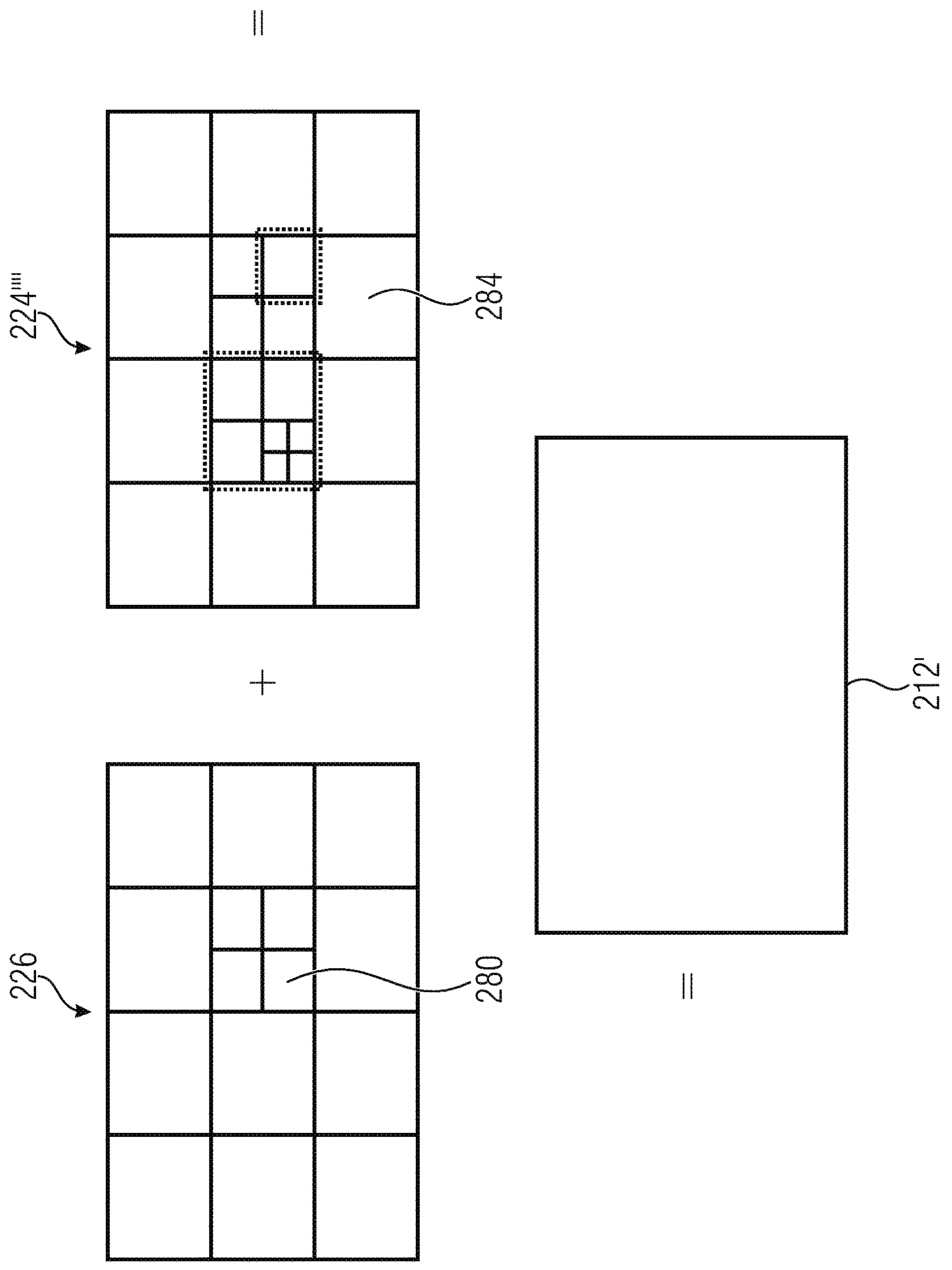
FIG. 22 shows a schematic diagram of an example for subdivisions of a picture with respect to prediction and residual coding and the relationship thereamong.

FIG. 22 illustrates the relationship between the reconstructed signal, i.e. the reconstructed picture 212', on the one hand, and the combination of the prediction residual signal 224'" as signaled via the data stream 14, and the prediction signal 226, on the other hand. As already denoted above, the combination may be an addition. The prediction signal 226 is illustrated in FIG. 22 as a subdivision of the picture area into blocks 280 of varying size, although this is merely an example. The subdivision may be any subdivision, such as a regular subdivision of the picture area into rows and columns of blocks, or a multi-tree subdivision of picture 212 into leaf blocks of varying size, such as a quadtree subdivision or the like, wherein a mixture thereof is illustrated in FIG. 22 where the picture area is firstly subdivided into rows and columns of tree-root blocks which are then further subdivided in accordance with a recursive multi-tree subdivisioning to result into blocks 280.

The prediction residual signal 224'" in FIG. 22 is also illustrated as a subdivision of the picture area into blocks 284. These blocks might be called transform blocks in order to distinguish same from the coding blocks 280. In effect, FIG. 22 illustrates that encoder 210 and decoder 220 may use two different subdivisions of picture 212 and picture 212', respectively, into blocks, namely one subdivisioning into coding blocks 280 and another subdivision into transform blocks 284. Both subdivisions might be the same, i.e. each block 280, may concurrently form a transform block 284 and vice versa, but FIG. 22 illustrates the case where, for instance, a subdivision into transform blocks 284 forms an extension of the subdivision into coding blocks 280 so that any border between two blocks 280 overlays a border between two blocks 284, or alternatively speaking each block 280 either coincides with one of the transform blocks 284 or coincides with a cluster of transform blocks 284. However, the subdivisions may also be determined or selected independent from each other so that transform blocks 284 could alternatively cross block borders between blocks 280. As far as the subdivision into transform blocks 284 is concerned, similar statements are thus true as those brought forward with respect to the subdivision into blocks 280, i.e. the blocks 284 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 280 and 284 are not restricted to being quadratic, rectangular or any other shape. Further, the subdivision of a current picture 212 into blocks 280 at which the prediction signal is formed, and the subdivision of a current picture 212 into blocks 284 at which the prediction residual is coded, may not the only subdivisions used for coding/decoding. These subdivision form a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters and the like.

FIG. 22 illustrates that the combination of the prediction signal 226 and the prediction residual signal 224''' directly results in the reconstructed signal 212'. However, it should be noted that more than one prediction signal 226 may be combined with the prediction residual signal 224''' to result into picture 212' in accordance with alternative embodiments such as prediction signals obtained from other views or from other coding layers which are coded/decoded in a separate prediction loop with separate DPB, for instance.

In FIG. 22, the transform blocks 284 shall have the following significance. Module 228 and module 252 perform their transformations in units of these transform blocks 284. For instance, many codecs use some sort of DST or DCT for all transform blocks 284. Some codecs allow for skipping the transformation so that, for some of the transform blocks 284, the prediction residual signal is coded in the spatial domain directly. However, in accordance with embodiments described below, encoder 210 and decoder 220 are configured in such a manner that they support several transforms. For example, the transforms supported by encoder 210 and decoder 220 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while module 228 would support all of the forward transform versions of these transforms, the decoder 220 or inverse transformer 252 would support the corresponding backward or inverse versions thereof:

Inverse DCT-II (or inverse DCT-III)
Inverse DST-IV
Inverse DCT-IV
Inverse DST-VII
Identity Transformation (IT)

At this different transforms can be applied in horizontal and vertical direction. As an example, a DCT-II could be used in horizontal direction and a DST-VII could be used in vertical direction, or vice versa.

In any case, it should be noted that the set of supported transforms may comprise merely one transform such as one spectral-to-spatial or spatial-to-spectral transform, and beyond this reference is made to the above description where further notes and examples are provided.

Thus, inter alias, above description revealed a video decoder in which one or more blocks of samples, which block might be called picture block and which samples might be called spatial or reconstructed or decoded samples, are reconstructed by predicting the samples using intra-picture or inter-picture prediction, parsing a quantization index from a bitstream, reconstructing transform coefficients using dependent quantization (value of a reconstructed transform coefficient is calculated using a current and one or more preceding quantization indexes), inverse transforming the reconstructed quantization coefficients for obtaining a block of reconstructed prediction error samples, and adding the reconstructed prediction error samples to the prediction signal in order to obtain a reconstructed block of video samples. Here, the dependent reconstruction of transform coefficients may be realized using two different (but not necessarily disjoint) sets of admissible reconstruction levels. The transform coefficients may be reconstructed in a defined reconstruction order by selecting one of the sets of reconstruction levels based on the values of the preceding quantization indexes in reconstruction order; choosing one reconstruction level of the selected set using the quantization index for the current transform coefficient (the quantization index specifies an integer index into the ordered set of admissible reconstruction values). The selection of the set of admissible reconstruction values may be specified by the parities of preceding quantization indexes in reconstruction order. The selection of the set of admissible reconstruction values may be realized using a state transition table (or an equivalent arithmetic operations) with the following properties: at the beginning of the reconstruction process for a transform block, a state variable is set equal to a defined value; the state uniquely determines the set of admissible reconstruction values for the next transform coefficient; the state for the next transform coefficient is derived using a table loop-up into a 2d table, where a first index is given by the current state and a second index is given by the parity of the current quantization index. Alternatively or additionally, the first set of admissible reconstruction levels may comprise all even integer multiples of a quantization step size; the second set of admissible reconstruction levels may comprise all odd integer multiples of a quantization step size and, in addition, the reconstruction level equal to zero. Here, the quantization step size may depend on the location of the transform coefficient inside the transform block (as, for example, specified by a quantization weighting matrix). Additionally or alternatively, the quantization step size may depend on a quantization parameter that can be modified on a block by block basis. The entropy coding may include a binarization of the values or the absolute values of quantization indexes and one or more of the bins may be coded using adaptive binary probability models, wherein for one of more of the bins that are coded using adaptive probability models, the probability model used may be selected among a set of adaptive probability models, and the probability model may be selected based on the set of admissible reconstruction levels (or the state). The binarization for the quantization indexes may comprise a bin that specifies whether the quantization index is equal to zero or unequal to zero, and said bin is coded using an adaptive probability model, which is selected among a set of adaptive probability models; and a subset among the set of available probability models may be selected given the set of admissible reconstruction levels for the current quantization index (or the state); and the probability model used, among the selected subset, may be determined using properties of the quantization indexes in a local neighborhood (in the array of transform coefficients) of the current quantization index. The bins resulting from the binarization of the quantization indexes may be entropy decoded in multiple passes over a transform block or a subblock of the transform block (which represents a subset of the locations of transform coefficients inside the transform block). The bins coded in a first pass may include any combination of the following bins: a bin that specifies whether a quantization index is equal to zero or not equal to zero; a bin that specifies whether the absolute value of a quantization index is greater than one or not greater than one; a bin that specifies the parity of a quantization index (or the parity of the absolute value of a quantization index).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for sequentially decoding, from a data stream, a sequence of samples corresponding to a picture, the method comprising:

entropy decoding a quantization index corresponding to a sample;

determining, based on the quantization index, a reconstruction level set of two reconstruction level sets, the two reconstruction level sets including:

a first reconstruction level set that includes reconstruction levels that are even multiples of a quantization step size, wherein the first reconstruction level set excludes reconstruction levels that are odd multiples of the quantization step size; and a second reconstruction level set that includes reconstruction levels that are odd multiples of the quantization step size and zero, wherein the second reconstruction level set excludes reconstruction levels that are nonzero even multiples of the quantization step size; and dequantizing the sample using the determined reconstruction level set.

2. The method of claim 1, wherein the reconstruction levels of the first reconstruction level set and the second reconstruction level set correspond to integer multiples of the quantization step size; and wherein the dequantizing further includes multiplying the quantization step size by an integer value corresponding to the determined reconstruction level set.

3. The method of claim 1, wherein the determining of the reconstruction level set is based on a result of a binary function of quantization indices decoded for one or more previous samples.

4. The method of claim 1, wherein the determining of the reconstruction level set is based on a parity of quantization indices decoded for one or more previous samples.

5. The method of claim 1, further comprising:

deriving a subset index for a preceding sample based on the determined reconstruction level set and a parity of the quantization index.

6. The method of claim 1, wherein the determining of the reconstruction level set is based on subset indices derived for one or more immediately preceding samples.

7. The method of claim 1, wherein the determining of the reconstruction level set is based on subset indices derived for two immediately preceding samples.

8. An apparatus for sequentially decoding, from a data stream, a sequence of samples corresponding to a picture, the apparatus comprising:

a processor; and a memory storing instructions that when executed by the processor cause the processor to perform operations comprising:

entropy decoding a quantization index corresponding to a sample;

determining, based on the quantization index, a reconstruction level set of two reconstruction level sets, the two reconstruction level sets including:

a first reconstruction level set that includes reconstruction levels that are even multiples of a quantization step size, wherein the first reconstruction level set excludes reconstruction levels that are odd multiples of the quantization step size; and a second reconstruction level set that includes reconstruction levels that are odd multiples of the quantization step size and zero, wherein the second reconstruction level set excludes reconstruction levels that are nonzero even multiples of the quantization step size; and dequantizing the sample using the determined reconstruction level set.

9. The apparatus of claim 8, wherein the reconstruction levels of the first reconstruction level set and the second reconstruction level set correspond to integer multiples of the quantization step size, and wherein the dequantizing further includes multiplying the quantization step size by an integer value corresponding to the determined reconstruction level set.

10. The apparatus of claim 8, wherein the determining of the reconstruction level set is based on a result of a binary function of quantization indices decoded for one or more previous samples.

11. The apparatus of claim 8, wherein the determining of the reconstruction level set is based on a parity of quantization indices decoded for one or more previous samples.

12. The apparatus of claim 8, the operations further comprising:

deriving a subset index for a preceding sample based on the determined reconstruction level set and a parity of the quantization index.

13. The apparatus of claim 8, wherein the determining of the reconstruction level set is based on subset indices derived for one or more immediately preceding samples.

14. The apparatus of claim 8, wherein the determining of the reconstruction level set is based on subset indices derived for two immediately preceding samples.

15. A non-transitory storage medium storing instructions, which when executed by a processor, cause the processor to perform operations comprising:

entropy decoding a quantization index corresponding to a sample;

determining, based on the quantization index, a reconstruction level set of two reconstruction level sets, the two reconstruction level sets including:

a first reconstruction level set that includes reconstruction levels that are even multiples of a quantization step size, wherein the first reconstruction level set excludes reconstruction levels that are odd multiples of the quantization step size; and a second reconstruction level set that includes reconstruction levels that are odd multiples of the quantization step size and zero, wherein the second reconstruction level set excludes reconstruction levels that are nonzero even multiples of the quantization step size; and dequantizing the sample using the determined reconstruction level set.

16. The non-transitory storage medium of claim 15, wherein the reconstruction levels of the first reconstruction level set and the second reconstruction level set correspond to integer multiples of the quantization step size, and wherein the dequantizing further includes multiplying the quantization step size by an integer value corresponding to the determined reconstruction level set.

17. The non-transitory storage medium of claim 15, wherein the determining of the reconstruction level set is based on a result of a binary function of quantization indices decoded for one or more previous samples.

18. The non-transitory storage medium of claim 15, wherein the determining of the reconstruction level set is based on a parity of quantization indices decoded for one or more previous samples.

19. The non-transitory storage medium of claim 15, the operations further comprising:

deriving a subset index for a preceding sample based on the determined reconstruction level set and a parity of the quantization index.

20. The non-transitory storage medium of claim 15, wherein the determining of the reconstruction level set is based on subset indices derived for one or more immediately preceding samples.

* * * * *